United States Patent
Morgan-Mar et al.

(10) Patent No.: US 9,836,855 B2
(45) Date of Patent: Dec. 5, 2017

(54) DETERMINING A DEPTH MAP FROM IMAGES OF A SCENE

(75) Inventors: David Morgan-Mar, Wollstonecraft (AU); Tuan Quang Pham, Epping (AU); Matthew R Arnison, Umina Beach (AU); Kieran Gerard Larkin, Putney (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 608 days.

(21) Appl. No.: 13/606,822

(22) Filed: Sep. 7, 2012

(65) Prior Publication Data
US 2013/0063566 A1    Mar. 14, 2013

(30) Foreign Application Priority Data

Sep. 14, 2011 (AU) .................................. 2011224051

(51) Int. Cl.
*G06T 7/571* (2017.01)
*H04N 13/02* (2006.01)
*G06T 7/00* (2017.01)

(52) U.S. Cl.
CPC .... *G06T 7/571* (2017.01); *G06T 2207/10148* (2013.01)

(58) Field of Classification Search
CPC .............. H04N 5/232; H04N 13/0271; G06T 2207/10148; G06T 7/0069

(Continued)

(56) References Cited

U.S. PATENT DOCUMENTS 4,965,442 A * 10/1990 Girod ...................... G02B 7/36
                                                                     250/201.7
4,965,840 A * 10/1990 Subbarao ............... G01C 3/085
                                                                     356/12

(Continued)

FOREIGN PATENT DOCUMENTS

| EP | 0408224 B1 | 9/1995 |
| WO | WO 2010017239 A1 * | 2/2010 |
| WO | WO 2011013030 A1 * | 2/2011 |

OTHER PUBLICATIONS

Favaro, et al., "A Theory of Defocus vis Fourier Analysis," (2008), IEEE, pp. 1-8.*

(Continued)

*Primary Examiner* — Christopher S Kelley
*Assistant Examiner* — Kathleen Walsh
(74) *Attorney, Agent, or Firm* — Canon USA, Inc., IP Division

(57) ABSTRACT

A technique determines a depth measurement associated with a scene captured by an image capture device. The technique receives at least first and second images of the scene, in which the first image is captured using at least one different camera parameter than that of the second image. At least first and second image patches are selected from the first and second images, respectively, the selected patches corresponding to a common part of the scene. The selected image patches are used to determine which of the selected image patches provides a more focused representation of the common part. At least one value is calculated based on a combination of data in the first and second image patches, the combination being dependent on the more focused image patch. The depth measurement of the common part of the scene is determined from the at least one calculated value.

16 Claims, 16 Drawing Sheets

(58) Field of Classification Search
USPC .......... 348/46, 49, 345, 335, 207.99, 65, 77,
348/E13.074, 234, 241, 103, E5.024;
382/128, 299; 375/285, 296, 346
See application file for complete search history.

(56) References Cited

U.S. PATENT DOCUMENTS

| | | | | |
|---|---|---|---|---|
| 5,003,166 | A * | 3/1991 | Girod | G01B 11/2513 250/201.4 |
| 5,193,124 | A * | 3/1993 | Subbarao | G01C 11/02 348/349 |
| 5,231,443 | A | 7/1993 | Subbarao | |
| 6,151,403 | A * | 11/2000 | Luo | G06K 9/00597 382/117 |
| 6,249,616 | B1 * | 6/2001 | Hashimoto | G06T 7/0034 345/427 |
| 6,711,214 | B1 * | 3/2004 | Hershberger | 375/285 |
| 7,187,810 | B2 * | 3/2007 | Clune | A61B 1/00009 382/128 |
| 7,200,253 | B2 * | 4/2007 | Glukhovsky et al. | 382/128 |
| 7,469,160 | B2 * | 12/2008 | Banks | A61B 5/0059 600/123 |
| 7,929,801 | B2 * | 4/2011 | Nakamura et al. | 382/285 |
| 7,990,462 | B2 * | 8/2011 | Wong et al. | 348/353 |
| 8,194,995 | B2 * | 6/2012 | Wong | H04N 5/23212 345/419 |
| 8,218,061 | B2 * | 7/2012 | Baxansky | H04N 5/23212 348/345 |
| 8,553,137 | B2 * | 10/2013 | Pollard | 348/349 |
| 8,593,509 | B2 * | 11/2013 | Iwasaki | G03B 35/08 348/46 |
| 8,593,542 | B2 * | 11/2013 | Steinberg | G06K 9/036 348/239 |
| 2001/0021224 | A1 * | 9/2001 | Larkin et al. | 375/240.16 |
| 2004/0228520 | A1 * | 11/2004 | Dresser et al. | 382/154 |
| 2007/0189750 | A1 * | 8/2007 | Wong | H04N 5/23212 396/121 |
| 2007/0206847 | A1 * | 9/2007 | Heumann | A61B 6/025 382/154 |
| 2008/0075444 | A1 * | 3/2008 | Subbarao | G03B 13/36 396/101 |
| 2008/0112649 | A1 * | 5/2008 | Chen | G06K 9/6857 382/302 |
| 2008/0297648 | A1 * | 12/2008 | Furuki | G02B 7/38 348/345 |
| 2009/0092282 | A1 * | 4/2009 | Avidan | G06T 7/292 382/103 |
| 2009/0167923 | A1 * | 7/2009 | Safaee-Rad et al. | 348/345 |
| 2009/0185760 | A1 * | 7/2009 | Okada et al. | 382/299 |
| 2010/0053417 | A1 * | 3/2010 | Baxansky | H04N 5/23212 348/345 |
| 2010/0066854 | A1 | 3/2010 | Mather et al. | |
| 2010/0080482 | A1 * | 4/2010 | Wong | H04N 5/23212 382/255 |
| 2010/0157070 | A1 * | 6/2010 | Mohanty | H04N 5/23248 348/208.1 |
| 2010/0194971 | A1 * | 8/2010 | Li | G02B 7/38 348/349 |
| 2011/0150447 | A1 * | 6/2011 | Li | G06T 7/0069 396/104 |
| 2011/0157320 | A1 * | 6/2011 | Oyama | 348/49 |
| 2011/0175984 | A1 * | 7/2011 | Tolstaya et al. | 348/46 |
| 2011/0199514 | A1 * | 8/2011 | Tamura | 348/234 |
| 2011/0229840 | A1 * | 9/2011 | Liang | A61B 5/1077 433/29 |
| 2011/0267477 | A1 * | 11/2011 | Kane | G02B 7/36 348/207.1 |
| 2011/0267486 | A1 * | 11/2011 | Kane | H04N 5/2226 348/222.1 |
| 2011/0267507 | A1 * | 11/2011 | Kane | G02B 27/0075 348/241 |
| 2012/0076362 | A1 * | 3/2012 | Kane | G06T 7/0069 382/106 |
| 2012/0177295 | A1 * | 7/2012 | Gronau | G06K 9/03 382/218 |
| 2012/0182448 | A1 * | 7/2012 | Cohen et al. | 348/231.99 |
| 2012/0249833 | A1 * | 10/2012 | Li | H04N 5/23212 348/231.99 |

OTHER PUBLICATIONS

Mendapara, "Depth Map Estimation Using Multi-focus Imaging," (2010), Electronic Theses and Dissertations.*
Ziou, et al., "Depth from Defocus Using the Hermite Transform," (1998), IEEE, pp. 1-5.*
Pentland, "A New Sense for Depth of Field," IEEE Transactions on Pattern Analysis and Machine Intelligence, vol. PAMI-9, No. 4, Jul. 1987.
Aydin et al., "An Occlusion Insensitive Adaptive Focus Measurement Method," Optics Express, Jun. 2010, vol. 18, No. 13, pp. 14212-14224.
McCloskey et al., "The Reverse Projection Correlation Principle for Depth from Defocus," IEEE Computer Society Proceedings of Third Symposium on 3D Data Processing, Visualization and Transmission, 2006.

* cited by examiner

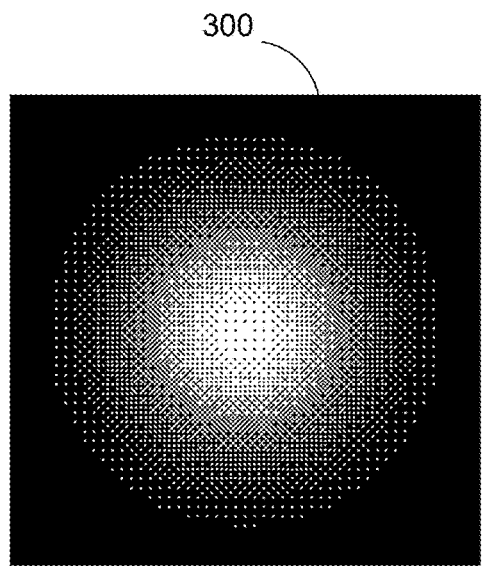
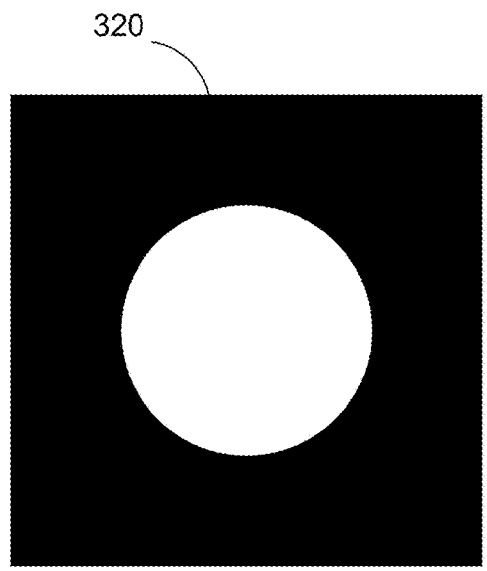
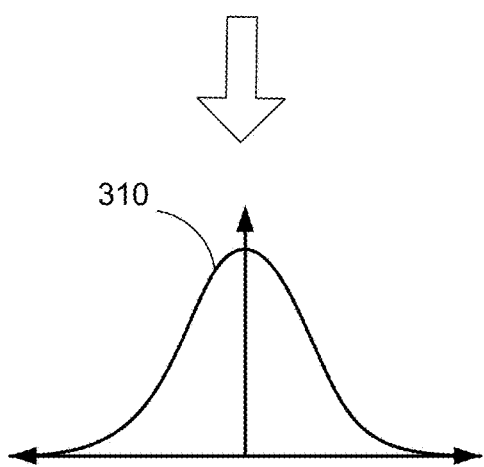
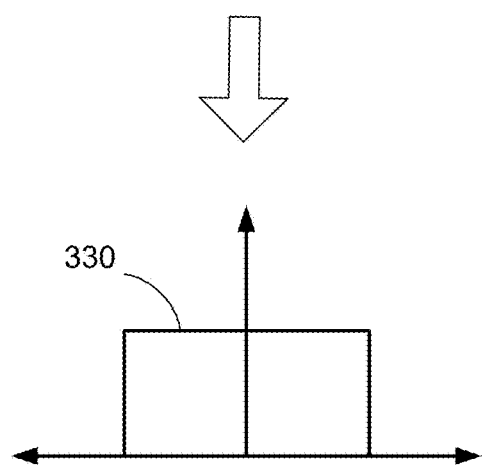
Fig. 3A          Fig. 3B

DETERMINING A DEPTH MAP FROM IMAGES OF A SCENE

REFERENCE TO RELATED PATENT APPLICATION

This application claims the benefit under 35 U.S.C. §119 of the filing date of Australian Patent Application No. 2011224051, filed Sep. 14, 2011, hereby incorporated by reference in its entirety as if fully set forth herein.

TECHNICAL FIELD

The current invention relates to digital image processing and, in particular, to determining the distance to objects in a scene from images of the scene.

BACKGROUND

In many applications of image capture, it can be advantageous to determine the distance from the image capture device to objects within the field of view of the image capture device. A collection of such distances to objects in an imaged scene is sometimes referred to as a depth map. A depth map of an imaged scene may be represented as an image, which may be of a different pixel resolution to the image of the scene itself, in which the distance to objects corresponding to each pixel of the depth map is represented by a greyscale or colour value.

A depth map can be useful in the field of consumer photography, as it enables several desirable post-capture image processing capabilities for photographs. For example, a depth map can be used to segment foreground and background objects to allow manual post-processing, or the automated application of creative photographic effects. A depth map can also be used to apply depth-related photographic effects such as simulating the aesthetically pleasing graduated blur of a high-quality lens using a smaller and less expensive lens.

Several features are desirable in any method of acquiring a depth map of a photographic scene. Depth accuracy is important, otherwise the resulting depth map may suggest that objects are at distances significantly different to their true distances. Depth resolution is important to allow the separation of objects that may be spatially close to one another in the scene and also to allow for accurate post-processing operations such as depth-dependent blurring. Spatial resolution of the depth map is also important in many applications, in particular, depth maps approaching the resolution of the photographic images themselves are useful for pixel-wise segmentation and avoiding visually obvious object boundary errors in many post-processing operations. Depth mapping methods should ideally be independent of the physical properties of the objects in the scene, such as reflectance, colour, texture, and orientation. This property is often referred to as scene independence. It is also desirable that depth mapping methods be tolerant of motion of objects in the scene and of motion of the image capture device. It is also desirable that depth mapping methods can be realised in practical devices such as consumer cameras with minimal additional cost, bulk, weight, image capture and processing time, and power consumption.

Several methods are known for determining a depth map from images of a scene. These can be classified into active and passive methods. Active depth mapping methods involve projecting beams or patterns of light or other radiation on to a scene. Distances can be measured either by timing the return of reflected rays, or by analysing the geometrical distortions of the patterns as they reflect off three-dimensional structures in the scene. Active methods require projection optics, which creates significant cost, weight, and power problems for applications such as consumer photography. In addition, active methods have limited range. For these reasons, passive depth mapping methods are more suitable than active methods for photography applications.

A known class of passive depth mapping methods involves capturing images of the scene from different viewpoints. The images of the scene can then be analysed to determine the apparent shifts in position of objects in the images of the scene caused by the stereoscopic effect. In general, stereoscopic methods suffer from the disadvantage of requiring multiple viewpoints. This necessitates either capturing images sequentially and moving the camera between shots, or capturing images using either multiple cameras or a camera with multiple lenses. In the case of capturing images sequentially, the time taken to move the camera may be problematic, especially for moving subjects, and precise alignment or calibration of the camera motion is needed. In the case of simultaneous capture, the requirement of multiple cameras or lenses increases the expense and difficulty of construction of the capture device.

Another class of passive depth mapping methods uses multiple shots taken by a single camera from a single viewpoint. These methods can be further split into two classes, named depth from focus (DFF), and depth from defocus (DFD). DFF methods use multiple shots taken of the scene at a large range of different focus positions. Analysis of image patches from each shot can then determine which shot corresponds to the best focus position for the object shown in a given image patch, which can in turn be associated with a calibrated depth. The main disadvantage of DFF methods is the requirement of taking a large number of images, resulting in long capture times, significant alignment problems for moving scenes, and long processing times.

DFD techniques attempt to measure the depths to objects in a scene by capturing a small number of images using different camera or capture parameters such as focus or aperture, and then comparing the images to analyse the difference in the amount of blurring of scene objects. Existing techniques then attempt to relate some measure of this blur difference to the depth of the imaged object by various theoretical calculations or empirical calibrations. DFD methods can estimate depths from as few as two images.

In addition to the desirable features for all depth mapping methods already mentioned—namely depth accuracy, depth resolution, spatial resolution, scene independence, motion tolerance, and low cost, weight, bulk, processing time, and power consumption—DFD methods in particular have further desirable feature requirements. DFD methods rely on quantification of blur difference to establish depth. Therefore it is desirable for DFD methods to operate well when the amount of blur difference achievable is limited by practical considerations of camera design. In particular, compact cameras typically have small lenses and sensors in order to keep costs low and produce a conveniently sized product. These constraints on the imaging system result in relatively small differences in blur (compared to larger cameras) because of the large depth of field of small optical systems. For example, typical blur differences achievable between two shots taken with a compact camera are of the order of a pixel or less. Another desirable feature of DFD methods is that they are based on a realistic model of the camera optical system. This allows a clear theoretical connection to be made between the measure of blur difference and the parameters of the image capture optical system. This further allows a thorough understanding of the connection between the blur difference measure and object depth so that appropriate consideration may be given to different imaging scenarios or difficult imaging conditions.

An example DFD method is given by Pentland in a paper titled "A New Sense for Depth of Field", published in July 1987 in *IEEE Transactions on Pattern Analysis and Machine Intelligence*, Vol. PAMI-9, No. 4, pp. 523-531, hereafter "Pentland. This method attempts to quantify the difference in amount of blur between two images taken with different apertures by estimating a blur radius for each image based on the assumption of a symmetrical Gaussian point spread function (PSF). This assumption assumes the lens optical transfer function (OTF) is a real Gaussian function, which is unrealistic for typical camera lenses, and consequently this assumption causes errors in the depth estimate. In addition, the Pentland method of calculating the blur radius is very sensitive to variations in scene texture and imaging noise. This sensitivity makes the method unsuitable for use with cameras taking photos of natural scenes.

Another example DFD method is given in U.S. Pat. No. 5,231,443 (Subbarao), granted in 1993. This method attempts to quantify the difference in amount of blur between two images taken with different camera parameters by summing rows or columns within an image region, performing a one-dimensional (1D) Fourier transform and then examining a small subset of the Fourier components. By the projection-slice theorem, this method is equivalent to examining a 1D slice through the two-dimensional (2D) Fourier transform of the image region. In photographs of a natural scene, there are usually a wide variety of textures. Two-dimensional Fourier transforms of these textures will have a variety of dominant orientations. Typical textures will have low energy along the spatial frequency axes, which means that the method of Subbarao will be sensitive to imaging noise and produce large errors in the depth estimate. This variation of errors with orientation of scene texture is highly undesirable for a depth mapping method.

An example DFD method using a different theoretical principle is given by McCloskey, et. al. in a paper titled "The Reverse Projection Correlation Principle for Depth from Defocus", published by the IEEE Computer Society in June 2006 in the *Proceedings of the Third International Symposium on 3D Data Processing, Visualization, and Transmission*, pp. 607-614. This method attempts to quantify the blur difference between two images by independently estimating the amount of blur in each image using a measure based on pixel auto-correlations, and then comparing this measure between the images. In this method there is no clear theoretical connection between the correlation measures and the physical optics principles that produce the blurring. It is therefore difficult to establish the accuracy of the method under a wide range of imaging conditions. Sample depth results from this method are noisy.

Another example DFD method is given by Aydin & Akgul in a paper titled "An occlusion insensitive adaptive focus measurement method", published Jun. 21, 2010 in *Optics Express*, Vol. 18, No. 13, pp. 14212-14224. This method attempts to quantify the blur difference between two images by calculating a cross-correlation between corresponding patches of the images. This produces a measure of similarity between the image patches, which is then related to object depth. A problem here is that an object with low contrast can appear more similar at high blur differences than an object with high contrast at a lower blur level, resulting in spurious depth assignments.

These examples are illustrative of the shortcomings of existing DFD approaches. A disadvantage of DFD methods in general is the fact that depth estimates are prone to error because of the relatively small amount of data used, the effects of scene texture variations and imaging noise, any misalignment between objects in the images caused by camera or subject motion, and the fact that the relationship between object distance and blur is complicated. For many DFD algorithms there is a poor link between the quantitative measure extracted from analysing the images and the actual depth in the scene, because of camera calibration methods which use inaccurate models of camera lenses, weak or absent theoretical connections between the depth estimate and physical optics theory, and high depth estimation sensitivities to one or more of imaging noise, image misalignment, exposure difference, and the variation of textures of objects in the scene.

DFD methods are particularly problematic when applied to images taken with compact cameras. The small lens and sensor size restricts the amount of blur difference that can be achieved between two shots of a scene and a small sensor is more prone to imaging noise than a larger sensor. These make it difficult to quantify the blur difference accurately.

SUMMARY

It is an object of the present invention to substantially overcome, or at least ameliorate, one or more deficiencies of existing arrangements.

Disclosed is a method for determining a depth measurement associated with a scene captured by an image capture device. The method involves receiving at least a first image and a second image of the scene captured by the image capture device, in which the first image is captured using at least one different camera parameter than that of the second image. At least a first image patch is selected from the first image and a second image patch is selected from the second image, the selected patches corresponding to a common part of the scene captured in each of the first and second images. The selected image patches are used to determine which of the selected image patches provides a more focussed representation of the common part of the scene captured in the patches. The method calculates at least one value based on a combination of the data in each of the first and second image patches, the combination being dependent on which of the image patches is determined to be the more focused image patch. The depth measurement of the common part of the scene is then determined from the at least one calculated value.

Also disclosed is method of determining a depth map associated with the scene and which applies the method to a number of parts of the scene in the captured images thereby forming a depth measurement for each part.

Other aspects are also disclosed.

BRIEF DESCRIPTION OF THE DRAWINGS

At least one embodiment of the present invention will now be described with reference to the following drawings, in which:

FIGS. 3A and 3B illustrate a two-dimensional Gaussian function and a two-dimensional pillbox function, and one-dimensional cross-sections thereof;

DETAILED DESCRIPTION INCLUDING BEST MODE

1. Introduction

The present disclosure is directed to providing methods of extracting a depth map from two images of a scene taken using a single camera with different camera capture parameters and substantially located at the same position. The methods seek to offer one or more of improved accuracy, greater tolerance to image misalignment, better tolerance to image exposure, improved tolerance to imaging noise, better tolerance to differences of object texture in the image, and faster calculation speed.

2. Context 2.1 Thin Lens Equation, Basic Geometry

The technical details of depth estimation rely on key aspects of the geometry and optics of imaging devices. Most scenes that are captured using an imaging device, such as a camera, contain multiple objects, which are located at various distances from the lens of the device. Commonly, the imaging device is focused on an object of interest in the scene. The object of interest shall be referred to as the subject of the scene.

Figure 1:
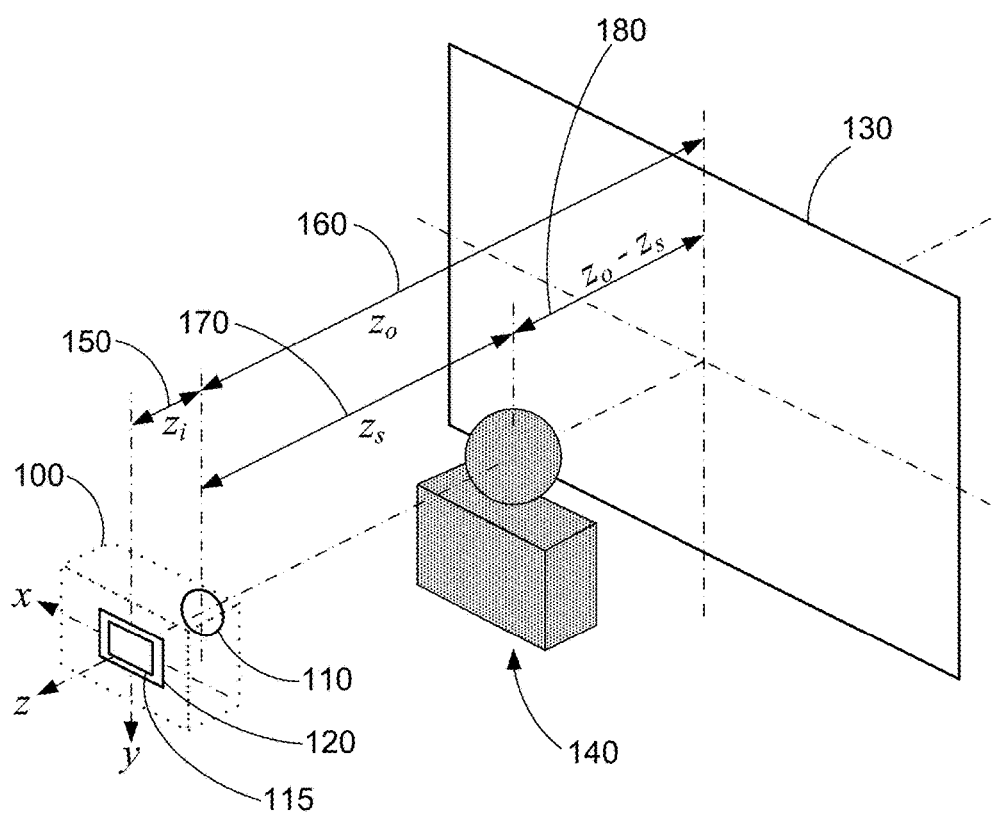
FIG. 1 is a schematic diagram of a scene and an image capture device positioned to capture an image of the scene.

FIG. 1 is a schematic diagram showing the geometrical relationships between key parts of an imaging device and objects in a scene to be captured. FIG. 1 shows an imaging device (e.g. a camera) 100 which includes a lens 110, and a sensor 115. FIG. 1 also shows an in-focus plane 130 and a general object 140 formed by sphere positioned upon a rectangular prism, forming part of the scene but not necessarily the subject of the scene to be captured. The image plane 120 of the imaging device 100, also referred to as the focal plane, is defined to be at the location of the sensor 115. When projected through the lens 110, the image plane 120 forms the in-focus plane 130, which can be considered to be a virtual plane in the geometrical region of the object 140. A distance 150 from the lens 110 to the image plane 120 is related to a distance 160 from the lens 110 to the in-focus plane 130, by the thin lens law according to the equation $$\frac{1}{z_i} + \frac{1}{z_o} = \frac{1}{f} \tag{1}$$

where f is the focal length of the lens 110, $z_i$ is the lens-to-sensor distance 150, and $z_o$ is the distance 160 from the lens 110 to the in-focus plane 130. The general scene object 140 is located at a distance 170 from the lens 110 and at a distance 180 from the in-focus plane 130. This distance 170 is referred to as $z_s$. The distance 180 from the object 140 to the in-focus plane 130 is given by $Z_o - Z_s$ and may be positive, zero, or negative. If the object 140 is focused onto the image plane 120, then $z_s = z_o$ and the object 140 is located in the in-focus plane 130. If $z_s$ is less than or greater than $z_o$, then the object 140 is located behind or in front of the in-focus plane 130 respectively, and the image of the object 140 will appear blurred on the image plane 120.

FIG. 1 illustrates a relatively simple geometrical optics model of imaging. This model relies on approximations including the thin lens approximation, paraxial imaging rays, and a lens free of aberrations. These approximations ignore some aspects of the optics that are inherent in actual imaging systems, but are sufficient for general understanding of imaging behaviour, as is understood by those skilled in the art.

Focusing is carried out either manually by the user or by using an autofocus mechanism that is built into the imaging device 100. Focusing typically manipulates the lens-to-sensor distance 150 in order to place the in-focus plane 130 such that the distance $z_o$ 160 is equal to the distance $z_s$ 170 to a specific object of interest, i.e. to place the subject in the in-focus plane 130. Other objects in the scene that have a distance $z_s$ from the lens 110 that is different from that of the subject are located either behind or in front of the in-focus plane 130. These other objects will appear blurred to some degree on the image plane 120 and thus in the image captured on the sensor 115. This blur is referred to as defocus blur.

2.2 Defocus Blur—Single Image

The amount of defocus blurring of an imaged object 140 increases with the distance 180 of the object 140 from the in-focus plane 130. The amount of defocus blur present in a given patch or portion of a captured 2D image can be characterised by the point spread function (PSF). The PSF is the response of the imaging system to a point source, defined such that the integral of the PSF over the image plane is equal to unity. The PSF of an optical system is generally a spatially restricted two-dimensional function of spatial coordinates (x, y) that approaches zero beyond a certain radial distance from the origin. The amount of blur can be characterised by measures of the shape of the PSF. Typical measures of the amount of blur are the full-width-at-half-maximum (FWHM) of the PSF, or the standard deviation of the PSF.

A basic understanding of the principles behind DFD may be gained by assuming a mathematically simple model for the PSF of a camera lens 110. To achieve this simplicity, prior art analyses often model the PSF as a two-dimensional Gaussian function. This assumption is followed in the present description for explanatory purposes only, noting that the PSFs of physical optical systems are typically not well approximated by Gaussian functions. Under this assumption, the standard deviation $\sigma$ of the Gaussian can be regarded as a blur radius, providing a convenient quantitative measure of the concept of "amount of blur". It can be shown that the relationship of the Gaussian blur radius $\sigma$, object distance $z_s$, and the camera image capture parameters of focal length f and lens aperture $A_v$ is given by $$z_s = \frac{fz_i}{z_i - f - 2\sigma A_V} \quad (2)$$

where $A_V$ is the relative aperture (also known as the f-number) of the lens 110. If the blur radius $\sigma$ of a point located at pixel coordinates $(x_i, y_i)$ in a captured image of a scene can be measured, the distance $z_s$ to an object at the corresponding point in the scene can be determined using equation (2), provided the remaining quantities in equation (2) are known.

However, determining depth from a single image of a scene without detailed prior knowledge of the scene to be imaged is known to be an unsolvable problem. This is because determining the blur radius $\sigma$ is not possible from a single image unless details of the unblurred scene image are known. For example, an image feature resembling a blurred disc may be caused by a disc of some indeterminate smaller size that has been blurred by some unknown amount, or by an object in the scene that resembles a blurred disc, rendered in sharp focus. Given this ambiguity, it is impossible to determine the blur radius $\sigma$. Thus, in terms of equation (2), even if the parameters $z_i$, f, and $A_V$ are known, it is not possible to determine depth from a single image of an unconstrained scene.

In the majority of circumstances, scenes are imaged without detailed knowledge of the structure of the objects in the scene. It is a general requirement for many imaging applications to work with unconstrained scenes, and even under carefully controlled imaging environments, such as portrait studios, it is very difficult to estimate the required information needed to obtain a depth map from a single image. However, referring to equation (2), it is theoretically possible to extract depth information using two captured images of the same scene, provided that the value of at least one of the parameters, in addition to blur radius $\sigma$, differs between the two captured images. This is the basic principle that underpins depth from defocus (DFD) methods, which rely on calculating the relative defocus blur between two images of a scene.

2.3 Defocus Blur—Two Images—Aperture Difference

Consider two images taken by a camera of the same scene with different relative apertures $A_V$, but with all other parameters remaining constant. Further, consider a small image patch taken from the first image, and a small image patch taken from the second image such that the patches show generally the same region of the scene being imaged. As is well known, the amount of defocus blur present in a patch of an image depends on two parameters: the distance $z_s-z_o$ 180 of the object 140 shown in the patch from the in-focus plane 130, and the relative aperture $A_v$ of the lens 110.

Firstly, if the object 140 shown in the patch is in the in-focus plane 130, then the object 140 appears in focus. The defocus blur radius $\sigma$ increases as the absolute value of the distance 180 of the object from the in-focus plane $|z_s-z_o|$ increases. Secondly, the defocus blur radius $\sigma$ increases as the relative aperture $A_v$ decreases. It can be shown that in this case the defocus blur radius $\sigma$ increases monotonically with increasing absolute distance 180 of the object 140 from the in-focus plane 130, $|z_s-z_o|$. This means that if the defocus blur radius $\sigma_1$ of the patch from the first image and the defocus blur radius $\sigma_2$ of the patch from the second image can be estimated, these estimates can be used in equation (2) to determine the distance of the object 140 shown in the patches from the in-focus plane 130, with an ambiguity over whether the object 140 is in front of, or behind, the in-focus plane 130.

Furthermore, it can be shown that the absolute value of the difference in the two blur radii $|\sigma_2-\sigma_1|$ increases monotonically with increasing absolute distance 180 of the object 140 from the in-focus plane 130, $|z_s-z_o|$. This means that if the difference in the two blur radii $|\sigma_2-\sigma_1|$ can be estimated from the two images, then this estimate can be used to estimate the distance of the object 140 shown in the patches from the in-focus plane 130, with an ambiguity over whether the object 140 is in front of or behind the in-focus plane 130.

Alternatively, some other measure of the difference in the amount of blur may be estimated from the two images. This other measure may not be an attempt to estimate the difference in blur radii, but rather some other quantification of the concept of "blur difference". It may be necessary in this case to calibrate the measure of blur difference empirically to a distance measure.

2.4 Defocus Blur—Two Images—Focus Difference

Alternatively, consider two images taken by a camera of the same scene with different lens-to-sensor distance $z_i$ 150, but all other parameters remaining constant. Further consider a small image patch taken from the first image, and a small image patch taken from the second image such that the patches show generally the same region of the scene being imaged.

Figure 2:
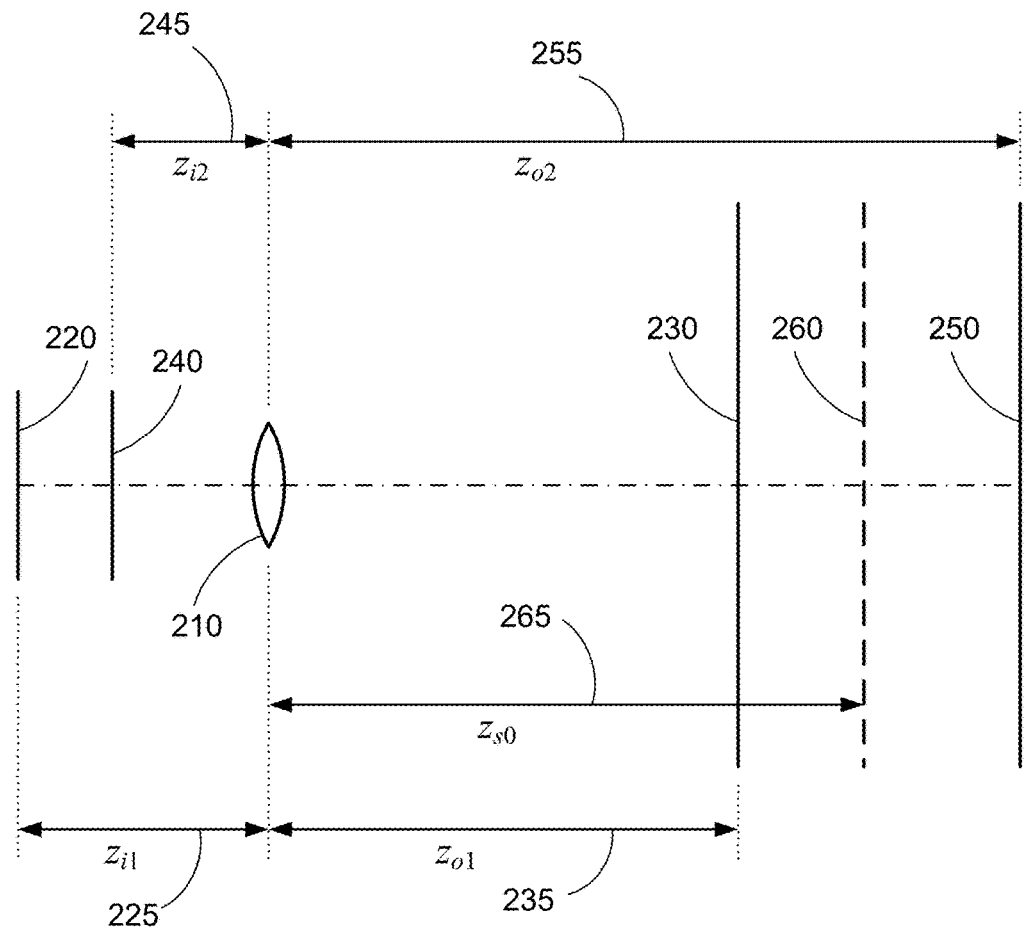
FIG. 2 is a schematic diagram illustrating the geometry of a lens forming two different images at two different focal planes.

FIG. 2 illustrates the geometry of two images taken with the lens-to-sensor distance $z_i$ 150 set to two different focus positions. FIG. 2 is drawn showing positions relative to a lens 210 via which the images are captured. A first image is captured with the sensor at a first position 220, a distance $z_{i1}$ 225 from the lens 210. The first in-focus plane 230 is at a distance $z_{o1}$ 235 from the lens 210. A second image is captured with the sensor at a second position 240, a distance $z_{i2}$ 245 from the lens 210. The second in-focus plane 250 is at a distance $z_{o2}$ 255 from the lens 210. Without loss of generality $z_{o1}<z_{o2}$ and, by equation (1), $z_{i1}>z_{i2}$.

Similar principles to the aperture difference case apply, but in this focus difference case the two images have different in-focus plane distances $z_{o1}$ 235 and $z_{o2}$ 255. A scene object will appear equally blurred in both images when its distance $z_s$ 170 from the lens falls at some specific distance $z_{s0}$ 265 somewhere in between the first in-focus plane 230 and the second in-focus plane 250, i.e. such that $z_{o1}<z_{s0}<z_{o2}$. A plane 260 parallel to the in-focus planes and at the distance $z_{s0}$ from the lens shall be referred to as the intermediate in-focus plane.

Objects farther from the lens 210 than the intermediate in-focus plane 260 will appear more blurred in the first image while objects closer to the lens 210 than the intermediate in-focus plane 260 will appear more blurred in the second image. It can be shown in this case that (a) the difference in the two blur radii $|\sigma_2-\sigma_1|$ increases monotonically with increasing distance between the object 140 and the intermediate in-focus plane 260, and that (b) the position of the object 140 either in front of or behind the intermediate in-focus plane 260 can be determined by determining which of the two image patches is less blurred (i.e. more focussed). This means that if the difference in the two blur radii $|\sigma_2-\sigma_1|$ can be estimated, and it can be determined which of the two image patches is less blurred, this information can be used to estimate the distance of the object shown in the patches from the intermediate in-focus plane 260, including disambiguating whether the object is in front of or behind the intermediate in-focus plane 260.

Alternatively, some other measure of the difference in the amount of blur may be estimated from the two images. This measure may not be an attempt to estimate the difference in blur radii, but rather some other quantification of the concept of "blur difference". It may be necessary in this case to calibrate the measure of blur difference empirically to a distance measure.

2.5 Practical Considerations

In practice, images of a scene are captured with some amount of imaging noise. This affects the accuracy of any measurements made by processing the image data. The simple optical models such as Gaussian PSFs used to derive the principles of many prior art DFD methods are also not realistic. Real lenses contain aberrations other than defocus, objects are imaged with large field angles, and diffraction effects can be important. There are also considerations of the amount of visual texture in the scene objects. For example, if an area of an object is uniform in colour and reflectivity, then it is impossible to distinguish any amount of blurring within this area.

For combinations of these reasons, DFD methods in practice have shown limited success at determining depth maps from realistic photographic scenes. Much of the reported success of DFD methods has been restricted to highly constrained test scenes. Furthermore, the relationship between blur radius and object distance given by equation (2) has proven to be of limited accuracy, requiring methods to be empirically calibrated to achieve useful results.

3. Overview

The arrangements presently described improve on the prior art by utilising more realistic theoretical modelling of the behaviour of lens optics in real world conditions, and by providing a more robust means of estimating depth from defocus in a scene independent manner and in the presence of imaging noise.

FIGS. 3A and 3B illustrates two simple two-dimensional functions that are commonly assumed as approximations to lens PSFs. FIG. 3A shows a two-dimensional Gaussian function 300, whose one-dimensional cross section is a one-dimensional Gaussian function 310. The two-dimensional Gaussian function 300 is illustrated schematically in a dithered fashion. FIG. 3B shows a circular pillbox function 320, whose one-dimensional cross section is a square function 330.

Prior art modelling of the lens behaviour in the context of DFD commonly assumes that the PSF of defocus blur is well modelled by a two-dimensional Gaussian function 300. In general this is not true. The defocus blur PSF of a photographic camera lens often more closely resembles a circular pillbox 320, with relatively sharp edges compared to the gradual fall-off of a Gaussian function. In reality, the shape of the defocus blur PSF is more complex than either of these approximations, and varies significantly from lens to lens and with different camera parameters for a single lens. The PSF also varies with field angle such that the PSF in one region of the image plane 120 may be different to the PSF in some other region of the image plane 120.

Also in particular, prior art modelling of the lens behaviour in the context of DFD assumes that consideration of the modulation transfer function (MTF), which is the modulus of the optical transfer function (OTF), is adequate to determine accurate depths from a comparison of two images. This assumption neglects the important contribution of the phase of the OTF, effectively disregarding half of the available data. By fully utilising the phase information, the arrangements presently disclosed can achieve significantly more accurate depth results than the prior art.

Also in particular, prior art estimates of depth based on a ratio of Fourier transforms of image patches are effectively based on estimates of the width of the relative PSF, which is heavily influenced by imaging noise.

Also in particular, prior art methods of comparing the amount of blur between two image patches by performing a cross-correlation between the patches have applied a normalisation designed for a different purpose. That different purpose is to eliminate any difference between the contrasts of the two patches on the assumption that they are both intended to be faithful representations of the same scene. This symmetric blur assumption is a poor one to make in the asymmetrical case when comparing two image patches that are known to have differing contrasts because one is more blurred than the other.

The presently disclosed arrangements facilitate a depth measure from a pair of images taken of the same scene with different camera parameters: (a) by recognising and utilising the fundamental asymmetry between less and more blurred image patches through the use of asymmetric patch selection when calculating blur difference measures, (b) without making any assumption about the shape of the defocus blur PSF, (c) without discarding the information present in the phase of the OTF, (d) using an improved method of characterising the relative blur between two image patches which is less sensitive to imaging noise than prior methods, and (e) without using a theoretically inappropriate cross-correlation normalisation technique. These features will be explained in detail in the following sections.

4. Mean Spectral Ratio 4.1. Theory

A method of determining depth from two images of the same scene can be developed by considering the theory of image formation. Consider a patch $f_0$ of the scene to be imaged, the patch being small enough such that any variation in object depth or PSF of the imaging system within the patch is small and thus can be ignored. The two-dimensional intensity distribution of the corresponding patch of an image $f_1$ of the intensity distribution of the patch $f_0$ can be modelled using a fully general point spread function (PSF) by a spatial convolution operation as follows:

$$f_1(x,y) = f_0(x,y) \otimes PSF_1(x,y) \quad (3)$$

where $PSF_1$ is the defocus blur PSF of the scene patch $f_0$ when it is projected on to the image patch $f_1$. Taking the Fourier transform of both sides of equation (3) gives $$F_1(u,v) = F_0(u,v) OTF_1(u,v) \quad (4)$$

where (u, v) are spatial frequency coordinates, $F_1$ is the Fourier transform of $f_1$, $F_0$ is the Fourier transform of $f_0$, and $OTF_1$ is the Fourier transform of $PSF_1$. By the Fourier convolution theorem the spatial convolution operation has become a product. The function $OTF_1$ is known as the optical transfer function (OTF). The OTF is a complex-valued function, with modulus and phase components.

Assume we have two images of the same scene taken with different camera parameters, but without moving the camera or any objects in the scene so that the images are in alignment with one another. Then the second image patch $f_2$ of the same scene patch $f_0$ may be modelled in the same way as equation (3), replacing the 1 subscripts with 2 subscripts. Taking the ratio of the Fourier transforms of corresponding patches in the two images gives $$\frac{F_1(u, v)}{F_2(u, v)} = \frac{OTF_1(u, v)}{OTF_2(u, v)} \quad (5)$$

where the Fourier transform $F_0(u, v)$ of the scene is common to the numerator and denominator of the right hand side and has been cancelled from the ratio. This ratio may be called the spectral ratio. When no noise is present, the spectral ratio is scene independent because all contributions of the scene have been cancelled out. In the presence of imaging or quantisation noise, the cancellation may not be perfect, but underlying behaviour of the spectral ratio is still largely or substantially scene independent.

The spectral ratio can be formed with an arbitrary assignment of the image patches as $f_1$ and $f_2$. However, as explained further below, it is advantageous to use asymmetric patch selection, based on which of the two image patches $f_1$ and $f_2$ is less blurred than the other image patch. Such a determination can be made by, for example, calculating the variance of the pixel intensities or brightness in each image patch, with the patch with the higher variance deemed to be less blurred, and thus the most focussed representation of the scene. Other methods of determining which patch is less blurred may be used, for example if the images are taken at different apertures and diffraction can be ignored, the patch captured with the narrower aperture may be deemed to be less blurred.

Once determination has been made of which patch is less blurred, the less blurred patch may be assigned as patch $f_2$, with the patch deemed to be more blurred assigned as $f_1$. This assignment allows an interpretation in which it is possible to consider $f_1$ as a more blurred version of $f_2$, related by a relative optical transfer function $OTF_r$ given by the spectral ratio:

$$F_1(u, v) = F_2(u, v) \frac{OTF_1(u, v)}{OTF_2(u, v)} \quad (6)$$
$$= F_2(u, v) OTF_r(u, v)$$

Taking the inverse Fourier transform of equation (6) gives the following relationship $$f_1(u,v) = f_2(u,v) \otimes PSF_r(u,v) \quad (7)$$

where $PSF_r$ is defined to be the relative point spread function (relative PSF) which when convolved with the image patch $f_2$ produces the image patch $f_1$. The relative point spread function $PSF_r$ is not simply related to $PSF_1$ and $PSF_2$, but is the result of a non-linear combination of the two. The relative point spread function $PSF_r$ varies with parameters of the imaging system such as focus and aperture, with the depth of the object imaged in patch $f_o$, and with field angle across the image plane 120.

4.2 Application to Depth Mapping

Figure 4:
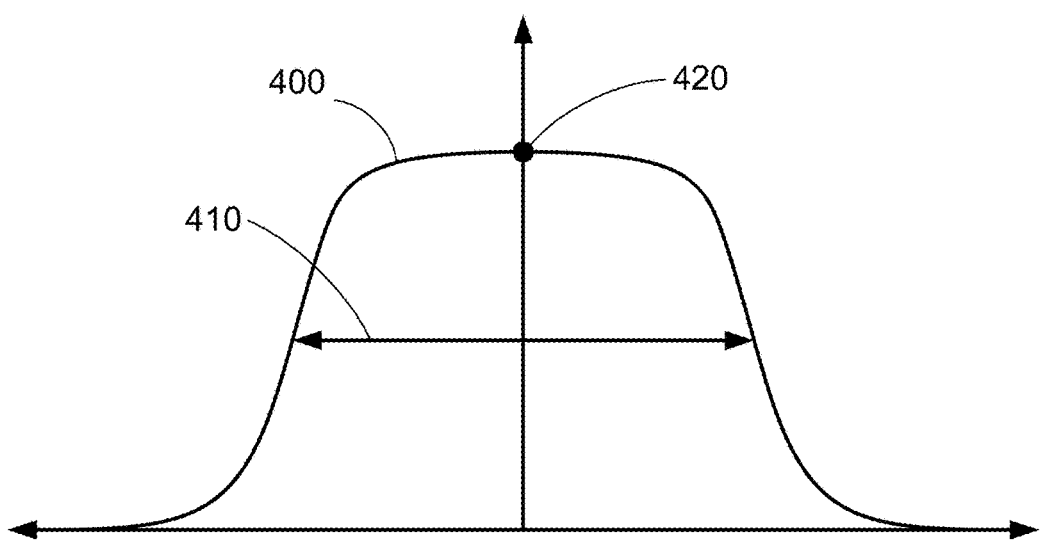
FIG. 4 is a diagram illustrating a one-dimensional cross-section of a general form of a two-dimensional point spread function.

An illustrative example of the shape of a relative PSF is shown in FIG. 4. FIG. 4 shows the shape 400 of a PSF, a measure of the width 410 of the PSF, and the peak value 420 of the PSF. In the absence of imaging noise, the relative PSF for physical optical systems will typically be a function with a value at the origin 420 that is maximal or near-maximal, and that falls to zero away from the origin. The measure of the width 410 may be a FWHM, a standard deviation, or some other measure of the width of the function.

For typical photographic situations, the Fourier spectrum $F_0$ of a scene patch $f_0$ will depend on the texture in the scene patch. Typically $F_0$ will have a power law distribution with respect to the radial spatial frequency coordinate, with many regions within $F_0$ having low values. $OTF_1$ and $OTF_2$ will also often have low values if there is significant defocus for a given image patch.

In the presence of imaging noise, determining the spectral ratio using equation (5) will result in noisy estimates for any spatial frequency coordinates where $F_0$, $OTF_1$, or $OTF_2$ have low values. Noise in the spectral ratio estimate also results in a noisy estimate of the relative PSF. In addition, the relative PSF calculated from two image patches will be sampled on the pixel grid of the image patches and will be windowed by the size of the patches. The windowing will produce artefacts in the Fourier transforms of the patches.

The artefacts produced by windowing may be reduced by applying a window function that falls off towards the edges of the square patch window, as is known by those skilled in the art. Such a window function will spread the energy of the DC frequency into other frequencies, resulting in loss of accuracy. To avoid this, the image patches may have their DC component removed prior to windowing, by subtracting the mean value of each patch from its corresponding patch. When forming the spectral ratio, this produces a division by zero at the DC pixel in the Fourier transforms. This can be treated as a special case and the value one may be assigned to the spectral ratio at the DC pixel, based on the assumption that the patches are equivalent in brightness or intensity. Alternatively, the DC pixel of the spectral ratio may be assigned a value equal to the ratio of the means of the image patches prior to DC removal.

Figure 5:
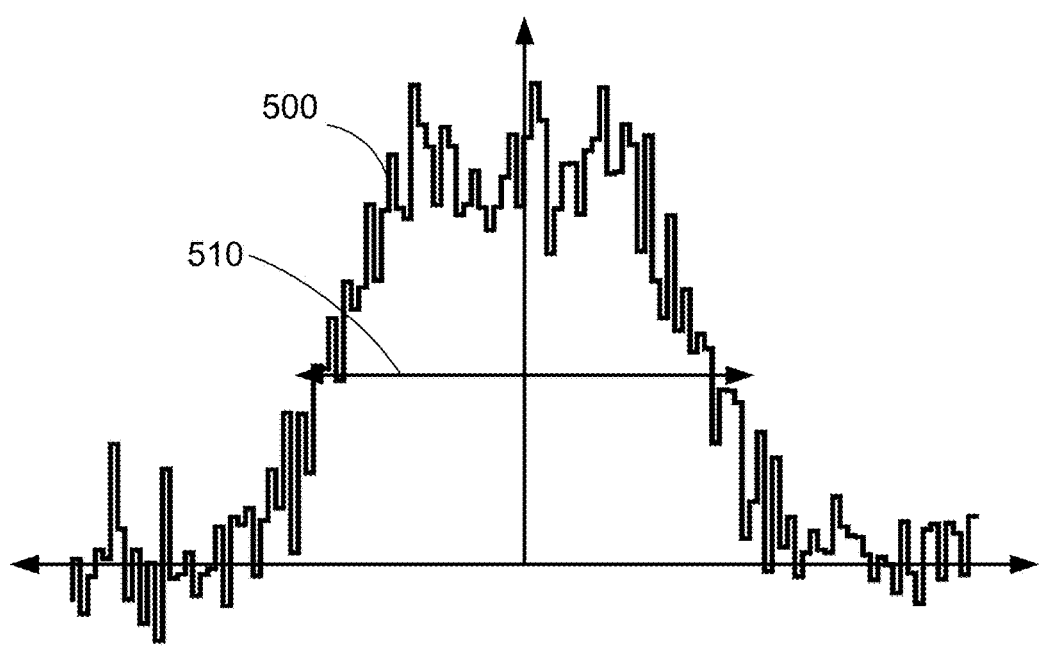
FIG. 5 is a diagram illustrating a one-dimensional cross-section of a general form of a two-dimensional point spread function as estimated from a digital image in the presence of imaging noise.

An illustrative example of a relative PSF obtained using the spectral ratio of two noisy image patches is shown in FIG. 5. FIG. 5 shows the shape 500 of a noisy, sampled PSF, and an estimated measure of the underlying width 510 of the noisy, sampled PSF 500. In this case, any empirical measure of the width 510 of the relative PSF is likely to be biased to some degree by the noise. In particular, an estimate of the FWHM would generally rely on assuming a functional form for the underlying shape of the relative PSF, fitting a curve to the noisy data, determining the maximum value of the curve, then taking the width of the curve at half that value. Each of these steps is susceptible to error because of the noise in the measurement.

An additional consideration when estimating the size of the relative PSF from a measured spectral ratio is that calculating the relative PSF requires first calculating the spectral ratio, then inverse Fourier transforming to obtain the relative PSF. This operation is costly in terms of processing time.

A faster and more robust method of estimating a parameter that encapsulates the relative blur width is to take the mean value of the spectral ratio over an area. The spectral ratio $OTF_r$ is a complex-valued function, but it is formed by the ratio $F_1/F_2$, where $F_1$ and $F_2$ are both Fourier transforms of real valued functions. This means that $F_1$ and $F_2$ are Hermitian functions, and so $F_1/F_2$, being the complex OTF ratio, is also Hermitian, that is $$Im[OTF_r(u,v)]==-Im[OTF_r(-u,-v)] \qquad (8)$$

where the Im( ) function takes the imaginary part of a complex number. This means that the sum of the spectral ratio values within an area with Hermitian symmetry is real, so the mean of the spectral ratio over such an area is a real number. By properties of the Fourier transform, the mean of the spectral ratio calculated over the whole patch is equal to the value 420 of the relative PSF at the origin. The value 420 of the relative PSF at the origin is a measure of the width of the relative blur, in that the wider the blur, the lower the value of the relative PSF at the origin and vice versa. The mean spectral ratio thus gives a measure of the amount of relative defocus blur between the two image patches $f_1$ and $f_2$ and hence can be used as a measure related to the distance 180 from the object shown in the image patch to either the in-focus plane 130 or the intermediate in-focus plane 260, depending on whether the images were captured with different camera apertures or focus settings, respectively.

Furthermore, the asymmetric patch selection determination provides a binary discriminator of which image patch is more focused, which is related directly to whether the object shown in the image patch is in front of or behind either the in-focus plane 130 or the intermediate in-focus plane 260. Combining this information with the distance determination uniquely identifies the distance of the object shown in the image patch from the camera.

The mean of the spectral ratio is generally a more robust measure of the relative blur than a direct estimate of the width of the relative PSF, because the averaging in the frequency domain tends to cancel the effects of random noise and produces an estimate of the peak height without requiring any assumption about the shape of the relative PSF or any additional parameter estimation. On the other hand, estimating the width of the relative PSF from a noisy, sampled PSF 500 requires assuming a functional form for the shape of the relative PSF, estimating multiple parameters to fit the shape to the noisy data, and then extracting the width parameter 510 from the fit.

Taking the mean of the modulus of the spectral ratio will in general produce a different number to taking the mean of the complex spectral ratio. In particular, by the triangle inequality, the mean of the modulus of the spectral ratio will generally be greater than the mean of the complex spectral ratio, with the difference being determined by the phase components of the OTFs. In general, this would mean that the estimate of the value 420 of the relative PSF at the origin is too large, implying a smaller relative defocus blur than is really present. This can lead to errors in depth estimation in the image patch. Similarly, taking the mean of the ratio of the moduli of the OTFs will also in general produce a different number to taking the mean of the complex spectral ratio, also leading to errors in depth estimation. For these reasons it is important for accurate depth estimation to maintain complex number arithmetic throughout the calculation.

Figure 6:
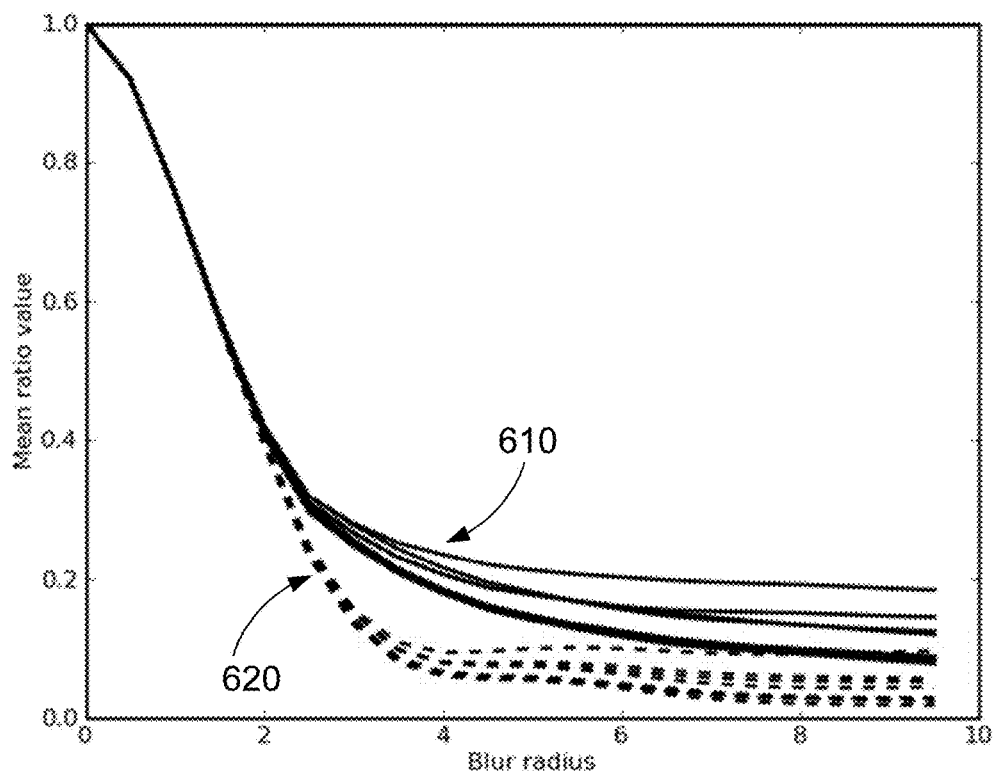
FIG. 6 is a graph showing values of two different depth measures plotted against relative blur radius.

Some of the advantages of the mean spectral ratio method over prior art methods in which the ratio of the MTFs is used, are demonstrated in FIG. 6. FIG. 6 shows plots of the mean of the MTF ratio 610 (solid lines) and the mean spectral ratio 620 (dashed lines) plotted against relative blur radius for eight different textures taken from a photo. The mean spectral ratio 620 shows a greater variation with relative blur radius than the mean of the MTF ratio 610 for values of blur radius difference less than approximately 4 pixels. The mean spectral ratio method is therefore significantly more sensitive than the prior art methods to blur radius difference in this small relative blur difference region. This small blur difference region is the region in which DFD using lenses and sensors typical of compact consumer cameras would operate. Also, the mean spectral ratio 620 shows less scatter with image texture than the mean of the MTF ratio 610, meaning the mean spectral ratio is less dependent on scene texture than the mean of the MTF ratio when imaging noise is present.

Another advantage of the mean spectral ratio method over many prior art methods is that it does not rely on an assumption that the relative OTF between two images depends only on the change in the amount of defocus blur between the images. Many prior art methods neglect the effects of other lens aberrations, implicitly assuming that they are either negligible or that any change in defocus is not accompanied by a change in other lens aberrations. Both of these assumptions are false for typical optical systems because of the relation between the optical pupil function and the OTF. The pupil function is a complex-valued function describing the amplitude and phase modulation of light passing through the pupil plane of the optical system. As is known to those skilled in the art, defocus can be described as a Zernike polynomial component of the pupil function. Lens aberrations such as spherical aberration, coma, or other aberrations can be described as Zernike polynomials orthogonal to the defocus polynomial. This means that, in terms of the pupil function, defocus can be separated from other aberrations and measured independently. However, the OTF is the autocorrelation of the pupil function and this autocorrelation mixes the orthogonal polynomials so they are no longer separable. This means that the relative OTF between two images captured at different focus is a mixture of relative defocus blur and blur caused by other lens aberrations, and that the two cannot be disambiguated. DFD models which ignore this effect are prone to mismatches between theory and experiment, potentially resulting in erroneous depth assignments. This can be particularly important in the case of compact cameras, which typically have lenses with significant aberrations. The mean spectral ratio method is general enough to avoid this assumption. If the lens aberrations are known they can be included in theoretical calibrations of mean spectral ratio to depth. For experimental calibration, the measured mapping from mean spectral ratio to depth will automatically include any effects of lens aberrations.

A variant of the mean spectral ratio is to calculate the median spectral ratio, defined as the median of the real parts of the spectral ratio taken over an area with Hermitian symmetry. This produces an estimate of the mean value of the spectral ratio that may be less biased by noise, and so also useful as a depth measure.

Another variant of the mean spectral ratio may be formed by replacing the complex division of equation (5) by an operation based on the arc tangent function. Division by values close to zero produces large results, and some values in the Fourier transforms of image patches may be close to zero and also affected by imaging noise. This may result in arbitrarily large spurious values in the spectral ratio. Therefore it is advantageous to use a mathematical function that maps arbitrarily large values to values within a finite range. A suitable function is the arc tangent, which maps the range 0 to infinity to the range 0 to $\pi/2$. In practice, the well-known a tan 2(y, x) version of the arc tangent function can be used, which takes two arguments x and y and returns the arc tangent of the ratio y/x. This function returns the finite value $\pi/2$ in cases where the division in equation (5) would produce an error because of a zero in the denominator. A complication arises because the a tan 2( ) function operates on real numbers, whereas the values in the Fourier transforms $F_1$ and $F_2$ and complex. Simply taking the arc tangent of the ratio of the moduli of $F_1$ and $F_2$ would discard the phase information, leading to errors in interpreting the result as a depth measure, as explained above for the spectral ratio. A variant a tan 2complex( ) of the a tan 2( ) function can be defined to return a value with the modulus of the arc tangent of the ratio of the two arguments, and a phase component equal to the difference in the phase components of the two arguments:

$$a\tan 2\ complex(y,x) = a\tan 2(|y|,|x|)\exp(i(\arg(y)-\arg(x))). \quad (9)$$

A value $OTF_{arc\ tan}$, called the arc tan spectral ratio, can then be defined by $$OTF_{arc\ tan}(u,v) = a\tan 2\ complex(OTF_2(u,v), OTF_1(u,v)). \quad (10)$$

The arc tan spectral ratio can then be treated similarly to the spectral ratio in further operations involving taking the mean or median of its values over an area in order to derive a measure related to the depth of an object shown in the image patch. The mean arc tan spectral ratio will be less affected by random imaging noise than the mean spectral ratio, thus providing an advantage. Similarly for the median arc tan spectral ratio.

4.3 Spectral Support and Noise

An additional consideration when calculating the mean spectral ratio is the amount of spectral support for the ratio. For typical image textures in a photographic scene, the Fourier transform will show significant amplitudes at low frequencies, but near-zero amplitudes at most high frequencies, where the signal will instead be dominated by imaging noise. At frequencies higher than the Nyquist frequency of the sensor of the image capture device, the signal will be zero, and all that will be seen is noise. This implies that the spectral ratio $OTF_r$ will have most of its meaningful signal concentrated in the low frequency region, with higher frequencies being noisier. At some frequencies the denominator of the spectral ratio may be very close to zero, making the spectral ratio at that frequency arbitrarily large. Taking the mean of a spectral ratio which includes such values can produce spurious results.

This problem can be addressed by filtering the image patch data before forming the spectral ratio, or by weighting or filtering of the spectral ratio data before taking the mean value, or both. One implementation of this aspect of the present disclosure is to apply a low-pass smoothing filter to the image patches before taking the Fourier transforms. Another implementation is to apply a band pass filter to the image patches before taking the Fourier transforms. Another implementation is to apply a Wiener filter or similar noise reducing filter to the spectral ratio to reduce the impact of pixels with large values caused by a division by a near-zero number. Yet another implementation is to weight the spectral ratio image with a radial function, such as a function proportional to some power of $1/(u^2+v^2)$.

Another implementation of image patch filtering is to take the mean of the pixels over an area defined by thresholding the signal-to-noise ratio of the Fourier spectrum of one of the image patches, preferably the patch in the denominator of the spectral ratio. Assuming that the noise amplitude in the image patch has a flat spectrum, the signal to noise ratio in each pixel of the image patch can be estimated as proportional to the modulus of the Fourier transform in that pixel. A threshold can then be applied to select a predetermined fraction of the pixels with the highest estimated signal-to-noise ratios. By properties of the Fourier transform, the selected subset of the pixels will have Hermitian symmetry, so the mean spectral ratio calculated over these selected pixels will be a real number. Similar filtering can also be applied to the median spectral ratio and the arc tan spectral ratio variants.

Another consideration when applying the mean spectral ratio to images taken with a digital camera is that the diffraction limit of the lens may occur at a spatial frequency less than the Nyquist frequency of the sensor. In this case, no scene information is present at spatial frequencies greater than the diffraction limit, and pixels in the Fourier transform $F_1$ of an image patch $f_1$ with $\sqrt{u^2+v^2}$ greater than the diffraction limit will contain only noise. If this is the case, these pixels can be discarded from the calculation of the mean spectral ratio. This can save processing time and the mean spectral ratio result will be less influenced by imaging noise without losing accuracy.

5. Modified Normalised Cross Correlation 5.1 Theory

A method of determining depth from two images of the same scene can be developed by considering the relative amounts of blur in two different images of the same scene captured using different camera parameters.

Consider two images of the same scene taken with different apertures, with all other camera parameters remaining fixed. Consider a patch $f_0$ of the scene to be imaged, small enough such that any variation in object depth within the patch is small, and the corresponding image patches $f_1$ in the first image and $f_2$ in the second image, where the patches are rectangular and m×n pixels in size. The central value of the normalised cross-correlation (NCC) of the two patches is defined by $$\frac{\sum_{i=0}^{m}\sum_{j=0}^{n}(f_1(x_i,y_j)-\overline{f_1})(f_2(x_i,y_j)-\overline{f_2})}{\sqrt{\sum_{i=0}^{m}\sum_{j=0}^{n}(f_1(x_i,y_j)-\overline{f_1})^2 \sum_{i=0}^{m}\sum_{j=0}^{n}(f_2(x_i,y_j)-\overline{f_2})^2}} \quad (11)$$

where $\overline{f_1}$ is the mean of the pixel values in image patch $f_1$, and $\overline{f_2}$ is the mean of the pixel values in image patch $f_2$. If the two patches $f_1$ and $f_2$ are blurred by the same amount, then, in the absence of imaging noise and object or camera motion, they will be identical. In this case the central value of the NCC will be unity. As the amount of blur difference between the two patches increases, the NCC central value falls. The NCC central value is therefore related to the blur difference between the two image patches. The normalisation term on the denominator is equal to the product of the standard deviation $\sigma_{f1}$ of the pixel values in the patch $f_1$ and the standard deviation $\sigma_{f2}$ of the pixel values in the patch $f_2$.

However, the normalisation of the NCC is symmetrical with respect to the image patches, which is appropriate under the assumption that the two patches are intended to be identical representations of the same data. This assumption is false in the case of correlating patches known to be images of the same scene, but with differing amounts of blur. In particular, the meaning and interpretation of a high correlation value is ambiguous: it may be caused by a scene with high texture being imaged with two different PSFs that differ only slightly, or it may be caused by a scene with low texture being imaged with two different PSFs that differ by a greater amount. So while the NCC is a good measure of similarity between images, the NCC is scene dependent and is a poor measure of the relative amount of blur.

A more discriminative and scene independent measure of the difference in the amount of blur between patch $f_1$ and $f_2$ can be achieved by recognising and utilising the asymmetry of the physical cause of the blur difference. To make the correlation a measure of blur difference unbiased by the texture of the scene, ideally one should normalise by the variance of the pixel intensities in the original scene. This information is not available, but given image patches $f_1$ and $f_2$, it is best approximated by the variance of the brightness or intensity of the image patch which is less blurred. Such an asymmetric patch selection can be made by, for example, calculating the variance of the pixel intensities in each image patch, with the patch with the higher variance deemed to be less blurred. Other methods of determining which patch is less blurred may be used, for example if the images are taken at different apertures and diffraction can be ignored, the patch captured with the narrower aperture may be deemed to be less blurred.

Once determination has been made of which patch is less blurred, the less blurred patch may be assigned as patch $f_2$, with the patch deemed to be more blurred assigned as $f_1$. A modified normalised cross-correlation (MNCC) may now be formed, where the central value is defined by $$\frac{\sum_{i=0}^{m}\sum_{j=0}^{n}(f_1(x_i,y_j)-\overline{f_1})(f_2(x_i,y_j)-\overline{f_2})}{\sum_{i=0}^{m}\sum_{j=0}^{n}(f_2(x_i,y_j)-\overline{f_2})^2} \quad (12)$$

The MNCC central value defined by equation (12) gives a measure of the amount of relative defocus blur between the two image patches $f_1$ and $f_2$ and hence can be used as a measure related to the distance 180 from the object shown in the image patch to the in-focus plane 130. The MNCC central value is more substantially independent of the scene than the prior art normalised cross correlation measure, and therefore provides an advantageous measure of the distance 180 from the object shown in the image patch to the in-focus plane 130.

To make the MNCC central value more sensitive to small differences in amount of blur between two image patches, a pre-filtering step can be carried out. Since edges carry the most information about the amount of blurring, a two-dimensional gradient operator such as the Laplacian operator can be applied to the image patches $f_1$ and $f_2$ to give gradient patches $g_1$ and $g_2$. The MNCC central value can then be formed using $g_1$ and $g_2$, though still using the determination of which original image patch $f_1$ and $f_2$ is the less blurred to determine whether $g_1$ and $g_2$ is used in the denominator of equation (12).

Figure 7:
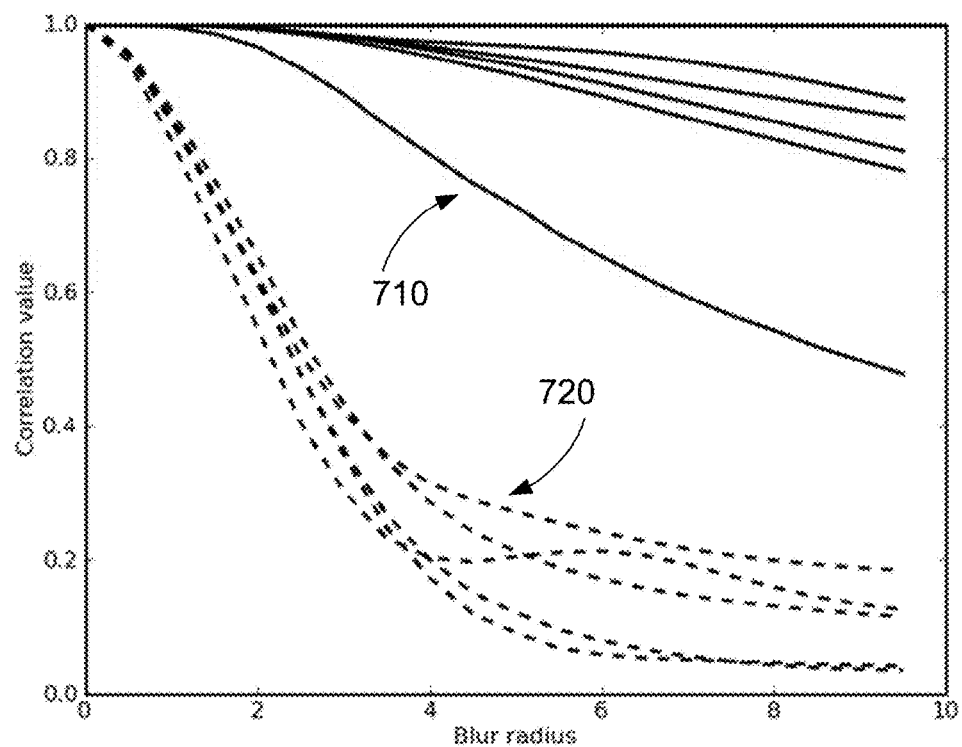
FIG. 7 is a graph showing values of two different depth measures plotted against relative blur radius.

Some of the advantages of this Laplacian MNCC method over the prior art NCC method are demonstrated in FIG. 7. FIG. 7 shows plots of the NCC central value 710 (solid lines) and the Laplacian MNCC central value 720 (dashed lines) plotted against relative blur radius for five different textures taken from a photo. The Laplacian MNCC central values 720 show a greater variation with relative blur radius than the NCC central values 710 for values of blur radius difference less than approximately 5 pixels. The Laplacian MNCC method is therefore significantly more sensitive than the prior art method to blur radius difference in this small relative blur difference region. This small blur difference region is the region in which DFD using lenses and sensors typical of compact cameras would operate. Also, for much of the region covered by the graph in FIG. 7, the Laplacian MNCC central values 720 show less scatter with image texture than the NCC central values 710, meaning the Laplacian MNCC method is less dependent on scene texture than the NCC central value.

Another variation of the MNCC algorithm is to replace the summations in equation (12) with summations over a subset of the pixels defined by a window function. This provides an advantage in image patches which contain object boundaries and consequently objects separated by a relatively large amount in depth. This window function can be chosen based on analysis of the image patch in a way similar to joint bilateral filtering, which is known to those skilled in the art. By choosing window functions appropriately, it is then possible to determine depths to two or more objects in a single image patch without contaminating the measurement of each object by the other objects.

6. Process Implementation, Variations, and Applications

The arrangements presently disclosed may be implemented on a variety of hardware platforms, including in an imaging device such as a camera, or on a general purpose computer (PC).

Figure 14A:
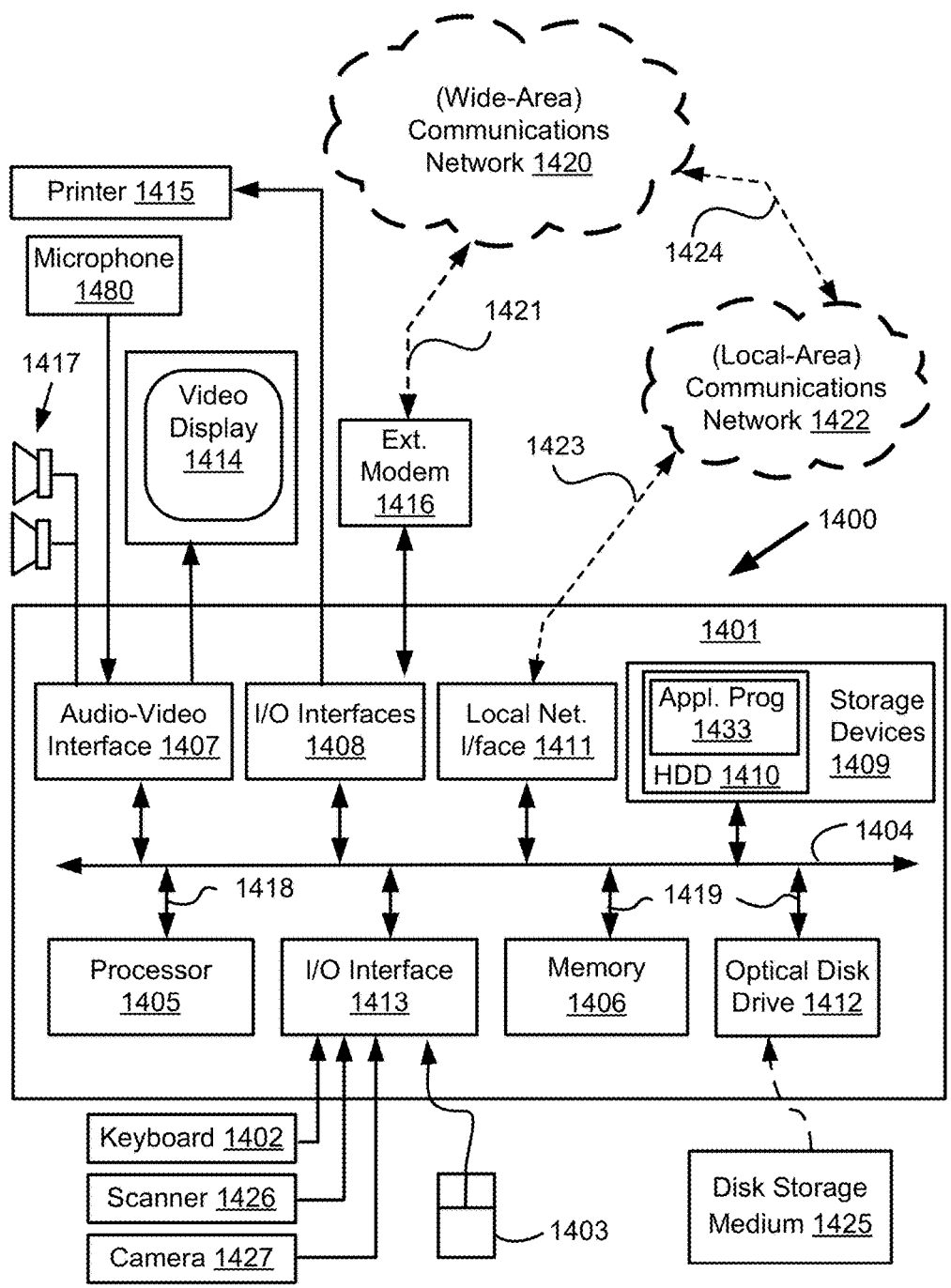
FIGS. 14A and 14B collectively form a schematic block diagram of a general purpose computer on which the embodiments of the invention may be practised.
Figure 14B:
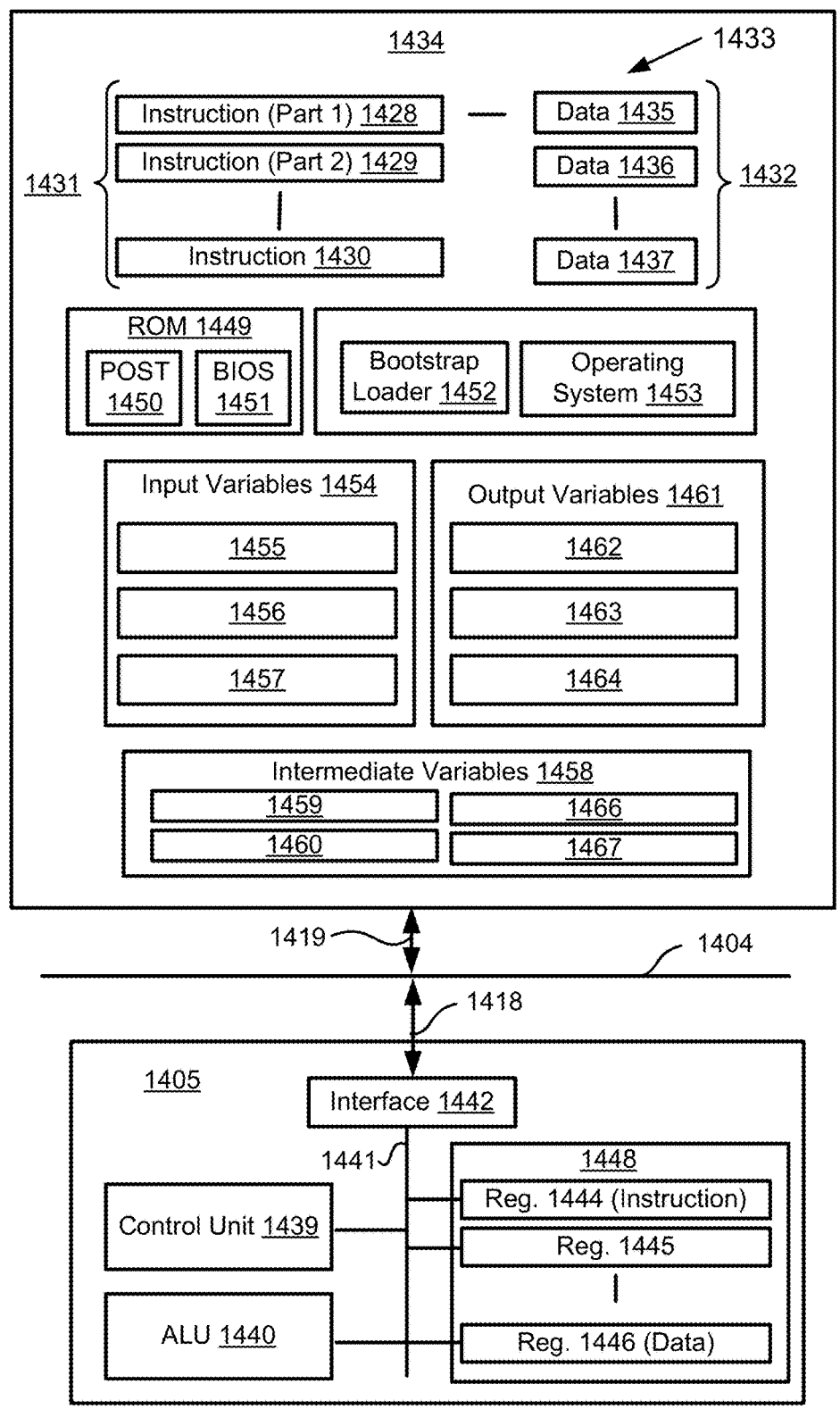

FIGS. 14A and 14B depict a general-purpose computer system 1400, upon which the various arrangements described can be practiced.

As seen in FIG. 14A, the computer system 1400 includes: a computer module 1401; input devices such as a keyboard 1402, a mouse pointer device 1403, a scanner 1426, a camera 1427, and a microphone 1480; and output devices including a printer 1415, a display device 1414 and loudspeakers 1417. An external Modulator-Demodulator (Modem) transceiver device 1416 may be used by the computer module 1401 for communicating to and from a communications network 1420 via a connection 1421. The communications network 1420 may be a wide-area network (WAN), such as the Internet, a cellular telecommunications network, or a private WAN. Where the connection 1421 is a telephone line, the modem 1416 may be a traditional "dial-up" modem. Alternatively, where the connection 1421 is a high capacity (e.g., cable) connection, the modem 1416 may be a broadband modem. A wireless modem may also be used for wireless connection to the communications network 1420.

The computer module 1401 typically includes at least one processor unit 1405, and a memory unit 1406. For example, the memory unit 1406 may have semiconductor random access memory (RAM) and semiconductor read only memory (ROM). The computer module 1401 also includes an number of input/output (I/O) interfaces including: an audio-video interface 1407 that couples to the video display 1414, loudspeakers 1417 and microphone 1480; an I/O interface 1413 that couples to the keyboard 1402, mouse 1403, scanner 1426, camera 1427 and optionally a joystick or other human interface device (not illustrated); and an interface 1408 for the external model 1416 and printer 1415. In some implementations, the modem 1416 may be incorporated within the computer module 1401, for example within the interface 1408. The computer module 1401 also has a local network interface 1411, which permits coupling of the computer system 1400 via a connection 1423 to a local-area communications network 1422, known as a Local Area Network (LAN). As illustrated in FIG. 14A, the local communications network 1422 may also couple to the wide network 1420 via a connection 1424, which would typically include a so-called "firewall" device or device of similar functionality. The local network interface 1411 may comprise an Ethernet™ circuit card, a Bluetooth™ wireless arrangement or an IEEE 802.11 wireless arrangement; however, numerous other types of interfaces may be practiced for the interface 1411.

The I/O interfaces 1408 and 1413 may afford either or both of serial and parallel connectivity, the former typically being implemented according to the Universal Serial Bus (USB) standards and having corresponding USB connectors (not illustrated). Storage devices 1409 are provided and typically include a hard disk drive (HDD) 1410. Other storage devices such as a floppy disk drive and a magnetic tape drive (not illustrated) may also be used. An optical disk drive 1412 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1400.

The components 1405 to 1413 of the computer module 1401 typically communicate via an interconnected bus 1404 and in a manner that results in a conventional mode of operation of the computer system 1400 known to those in the relevant art. For example, the processor 1405 is coupled to the system bus 1404 using a connection 1418. Likewise, the memory 1406 and optical disk drive 1412 are coupled to the system bus 1404 by connections 1419. Examples of computers on which the described arrangements can be practised include IBM-PC's and compatibles, Sun Sparcstations, Apple Mac™ or a like computer systems.

The methods of image depth measurement may be implemented using the computer system 1400 wherein the DFD processes of FIGS. 8 to 13, to be described, may be implemented as one or more software application programs 1433 executable within the computer system 1400. In particular, the steps of the method of depth measurement are effected by instructions 1431 (see FIG. 14B) in the software 1433 that are carried out within the computer system 1400. The software instructions 1431 may be formed as one or more code modules, each for performing one or more particular tasks. The software may also be divided into two separate parts, in which a first part and the corresponding code modules performs the depth measurement methods and a second part and the corresponding code modules manage a user interface between the first part and the user.

The software may be stored in a computer readable medium, including the storage devices described below, for example. The software is loaded into the computer system 1400 from the computer readable medium, and then executed by the computer system 1400. A computer readable medium having such software or computer program recorded on the computer readable medium is a computer program product. The use of the computer program product in the computer system 1400 preferably effects an advantageous apparatus for image depth measurement.

The software 1433 is typically stored in the HDD 1410 or the memory 1406. The software is loaded into the computer system 1400 from a computer readable medium, and executed by the computer system 1400. Thus, for example, the software 1433 may be stored on an optically readable disk storage medium (e.g., CD-ROM) 1425 that is read by the optical disk drive 1412. A computer readable medium having such software or computer program recorded on it is a computer program product. The use of the computer program product in the computer system 1400 preferably effects an apparatus for depth measurement for imaging.

In some instances, the application programs 1433 may be supplied to the user encoded on one or more CD-ROMs 1425 and read via the corresponding drive 1412, or alternatively may be read by the user from the networks 1420 or 1422. Still further, the software can also be loaded into the computer system 1400 from other computer readable media. Computer readable storage media refers to any non-transitory tangible storage medium that provides recorded instructions and/or data to the computer system 1400 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1401. Examples of transitory or non-tangible computer readable transmission media that may also participate in the provision of software, application programs, instructions and/or data to the computer module 1401 include radio or infra-red transmission channels as well as a network connection to another computer or networked device, and the Internet or Intranets including e-mail transmissions and information recorded on Websites and the like.

The second part of the application programs 1433 and the corresponding code modules mentioned above may be executed to implement one or more graphical user interfaces (GUIs) to be rendered or otherwise represented upon the display 1414. Through manipulation of typically the keyboard 1402 and the mouse 1403, a user of the computer system 1400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1417 and user voice commands input via the microphone 1480.

FIG. 14B is a detailed schematic block diagram of the processor 1405 and a "memory" 1434. The memory 1434 represents a logical aggregation of all the memory modules (including the HDD 1409 and semiconductor memory 1406) that can be accessed by the computer module 1401 in FIG. 14A.

When the computer module 1401 is initially powered up, a power-on self-test (POST) program 1450 executes. The POST program 1450 is typically stored in a ROM 1449 of the semiconductor memory 1406 of FIG. 14A. A hardware device such as the ROM 1449 storing software is sometimes referred to as firmware. The POST program 1450 examines hardware within the computer module 1401 to ensure proper functioning and typically checks the processor 1405, the memory 1434 (1409, 1406), and a basic input-output systems software (BIOS) module 1451, also typically stored in the ROM 1449, for correct operation. Once the POST program 1450 has run successfully, the BIOS 1451 activates the hard disk drive 1410 of FIG. 14A. Activation of the hard disk drive 1410 causes a bootstrap loader program 1452 that is resident on the hard disk drive 1410 to execute via the processor 1405. This loads an operating system 1453 into the RAM memory 1406, upon which the operating system 1453 commences operation. The operating system 1453 is a system level application, executable by the processor 1405, to fulfil various high level functions, including processor management, memory management, device management, storage management, software application interface, and generic user interface.

The operating system 1453 manages the memory 1434 (1409, 1406) to ensure that each process or application running on the computer module 1401 has sufficient memory in which to execute without colliding with memory allocated to another process. Furthermore, the different types of memory available in the system 1400 of FIG. 14A must be used properly so that each process can run effectively. Accordingly, the aggregated memory 1434 is not intended to illustrate how particular segments of memory are allocated (unless otherwise stated), but rather to provide a general view of the memory accessible by the computer system 1400 and how such is used.

As shown in FIG. 14B, the processor 1405 includes a number of functional modules including a control unit 1439, an arithmetic logic unit (ALU) 1440, and a local or internal memory 1448, sometimes called a cache memory. The cache memory 1448 typically includes a number of storage registers 1444-1446 in a register section. One or more internal busses 1441 functionally interconnect these functional modules. The processor 1405 typically also has one or more interfaces 1442 for communicating with external devices via the system bus 1404, using a connection 1418. The memory 1434 is coupled to the bus 1404 using a connection 1419.

The application program 1433 includes a sequence of instructions 1431 that may include conditional branch and loop instructions. The program 1433 may also include data 1432 which is used in execution of the program 1433. The instructions 1431 and the data 1432 are stored in memory locations 1428, 1429, 1430 and 1435, 1436, 1437, respectively. Depending upon the relative size of the instructions 1431 and the memory locations 1428-1430, a particular instruction may be stored in a single memory location as depicted by the instruction shown in the memory location 1430. Alternately, an instruction may be segmented into a number of parts each of which is stored in a separate memory location, as depicted by the instruction segments shown in the memory locations 1428 and 1429.

In general, the processor 1405 is given a set of instructions which are executed therein. The processor 1405 waits for a subsequent input, to which the processor 1405 reacts to by executing another set of instructions. Each input may be provided from one or more of a number of sources, including data generated by one or more of the input devices 1402, 1403, data received from an external source across one of the networks 1420, 1422, data retrieved from one of the storage devices 1406, 1409 or data retrieved from a storage medium 1425 inserted into the corresponding reader 1412, all depicted in FIG. 14A. The execution of a set of the instructions may in some cases result in output of data. Execution may also involve storing data or variables to the memory 1434.

The disclosed depth measurement arrangements use input variables 1454, which are stored in the memory 1434 in corresponding memory locations 1455, 1456, 1457. The arrangements produce output variables 1461, which are stored in the memory 1434 in corresponding memory locations 1462, 1463, 1464. Intermediate variables 1458 may be stored in memory locations 1459, 1460, 1466 and 1467.

Referring to the processor 1405 of FIG. 14B, the registers 1444, 1445, 1446, the arithmetic logic unit (ALU) 1440, and the control unit 1439 work together to perform sequences of micro-operations needed to perform "fetch, decode, and execute" cycles for every instruction in the instruction set making up the program 1433. Each fetch, decode, and execute cycle comprises:

(a) a fetch operation, which fetches or reads an instruction 1431 from a memory location 1428, 1429, 1430;

(b) a decode operation in which the control unit 1439 determines which instruction has been fetched; and (c) an execute operation in which the control unit 1439 and/or the ALU 1440 execute the instruction.

Thereafter, a further fetch, decode, and execute cycle for the next instruction may be executed. Similarly, a store cycle may be performed by which the control unit 1439 stores or writes a value to a memory location 1432.

Each step or sub-process in the processes of FIGS. 8 to 13 is associated with one or more segments of the program 1433 and is performed by the register section 1444, 1445, 1446, the ALU 1440, and the control unit 1439 in the processor 1405 working together to perform the fetch, decode, and execute cycles for every instruction in the instruction set for the noted segments of the program 1433.

The method of depth measurement incorporating DFD techniques may alternatively be implemented in whole or part in dedicated hardware such as one or more integrated circuits performing the functions or sub functions to be described. Such dedicated hardware may include graphic processors, digital signal processors, or one or more microprocessors and associated memories.

For example, a camera may implement the DFD algorithmic processes to be described in hardware or firmware in order to capture pairs of images with different camera parameters and to process the captured images to provide a depth map for various purposes. Such purposes may include artificially bluffing the background of portrait photos to achieve a pleasing aesthetic, or attaching depth information as image metadata to enable various post-processing operations. In this case, the camera hardware can capture multiple images of a scene, the images being suitable for application of the DFD processing, processing occurs in the camera's embedded devices, and results would be retained in a memory of the camera or written to a memory card or other memory storage device connectable to the camera.

The capture of multiple images of a scene with different capture parameters may be performed by capturing multiple images with a single user operation (a single depression of a capture button of the camera 1427) which causes one image to be captured and stored, the parameter to be changed, and a further image to be then captured and stored. Such capturing may occur within approximately 0.001-0.5 seconds causing both images to include substantially the same if not identical content and thus substantial common image content upon which image depth processing may then be performed.

In another example, a desktop computer or the like may implement the DFD processing in software to enable post-capture processing of photos to generate depth maps, which a user can use for image segmentation or further image processing operations. In this case, the camera 1427 would capture multiple images of a scene in a traditional fashion, the images being suitable for application of the DFD process, and the images would be retained in memory or written to a memory card or other memory storage device. At a later time, the images would be transferred to the computer (e.g. 1401), where subsequent steps of the DFD process would use them as input.

Other implementations may capture two images with different camera parameters, the varying parameters being one or more of: focus, zoom, aperture, or any other camera setting that influences the amount of blur in the captured image. In the case of some parameters, such as zoom in particular but also focus and potentially other parameters, the magnification of the captured images may be different. In this case one or more of the images may be scaled to bring the images substantially into registration before applying the DFD algorithm to determine depths.

Figure 15A:
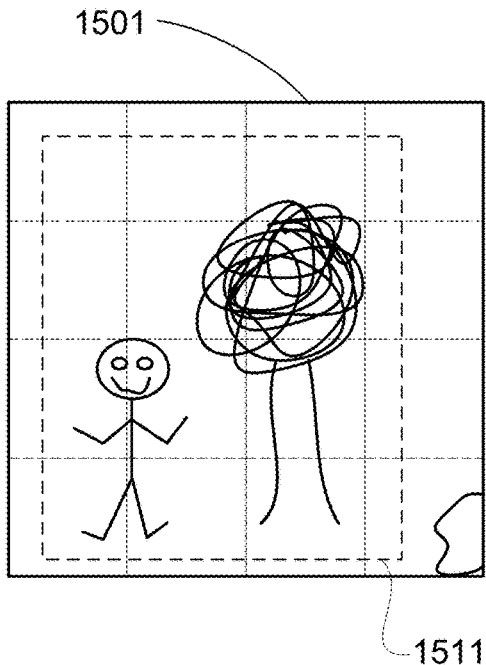
FIGS. 15A, 15B and 15C illustrate example images upon which depth measurements according to the present disclosure may be performed.
Figure 15B:
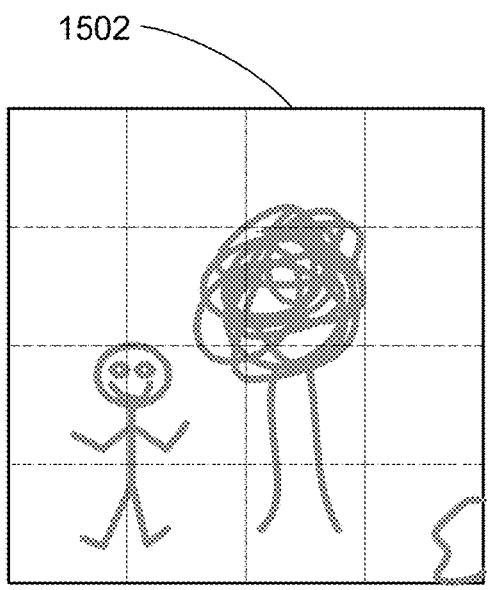

FIGS. 15A and 15B illustrate a first pair of exemplary images 1501 and 1502 respectively upon which the DFD processing may be performed. The scene content captured by the images 1501 and 1502 is identical, but the images 1501 and 1502 capture different image content in view of the image 1502 being captured with at least one camera parameter different to the capture of image 1501. For example, image 1502 may be differently focused relative to the image 1501.

Figure 15C:
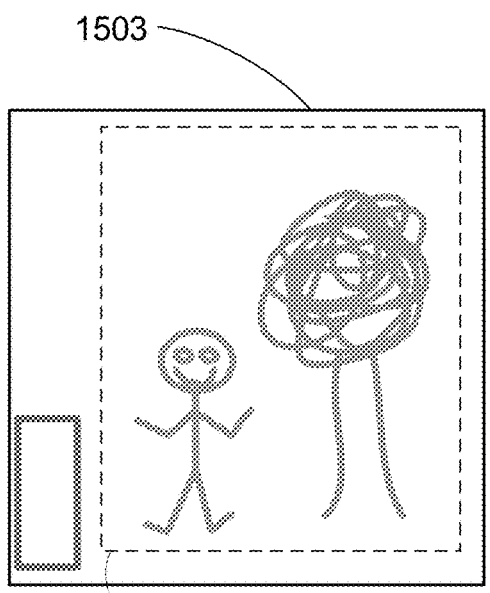

FIGS. 15A and 15C illustrate a second pair of exemplary images 1501 and 1503 respectively upon which DFD processing may also be performed. The scene content captured by the images 1501 and 1503 is not identical in total content, however the images 1501 and 1503 capture a scene that is common, or includes common scene content, to both images. That common scene content is indicated by dashed rectangles 1511 and 1513 in FIGS. 15A and 15C respectively and shows a person standing adjacent to a tree.

The common scene content may appear at different positions within the images 1501 and 1503. The differences in position of the common scene content between the images 1501 and 1503 may result from, for example, slight camera movement between capture of the two images. The image content of images 1501 and 1503 within the regions 1511 and 1513 capturing common scene content may further be different in view of image 1503 being captured with at least one camera parameter different to the capture of image 1501. For example, image 1503 may be differently focused relative to image 1501.

Significantly, in each of FIGS. 15A-15C, a common part of the scene content (being the person adjacent the tree) is captured in each image. Depth map processing may therefore be performed on pairs of the images to determine a depth map for the common part. Note that FIGS. 15B and 15C may also represent an image pair upon which DFD processing may be performed.

Certain implementations may capture more than two images, with one or more pairs of the images used to derive depth using the DFD algorithm.

7. Depth from Defocus Process

Figure 8:
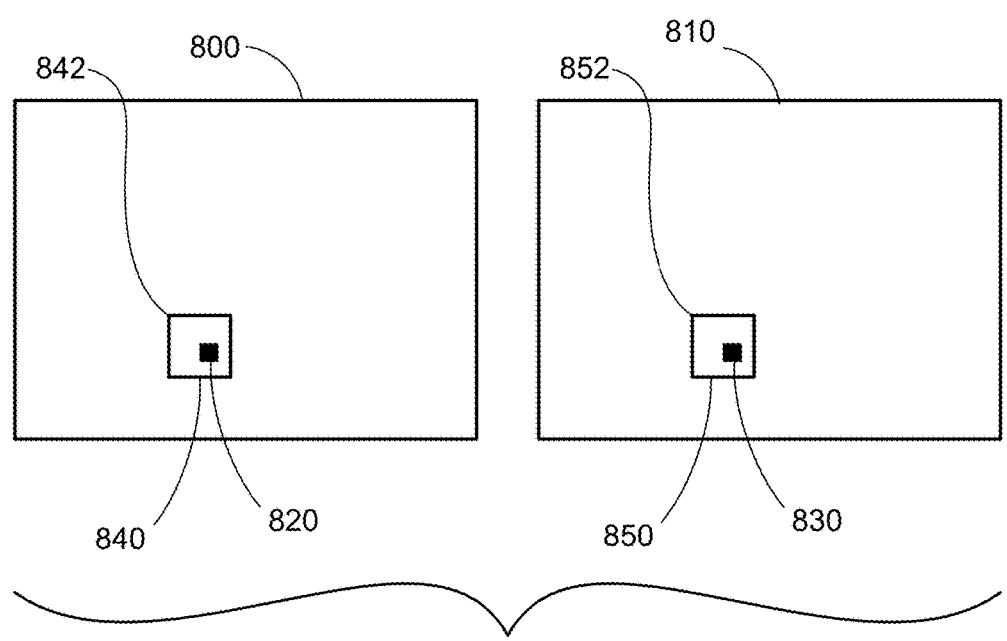
FIG. 8 is a diagram illustrating the correspondence between pixels and image patches within a first image and a second image of a scene.

A method of extracting a depth map from two images of a scene will now be described in detail with reference to FIG. 8 and FIG. 9 and the arrangements of FIGS. 14A and 14B where substantive processing occurs within the computer 1401. FIG. 8 illustrates a first image 800 of a scene and a second image 810 of the same scene (not illustrated). A selected pixel 820 in the first image 800 is highlighted and a corresponding selected pixel 830 in the second image 810 is highlighted. The correspondence is such that the selected pixel 820 in the first image 800 and the selected pixel 830 in the second image 810 largely correspond to the same point in the scene being imaged. This may be achieved in practice by ensuring that no objects in the scene move in the time between the exposures used to capture the first image 800 and the second image 810 and also that the camera 1427 which captures the images 800 and 810 does not move in the time between the exposures, and then selecting pixels from the same (x, y) coordinates on the image sensor. It may also be achieved by an alignment process which explicitly determines which pixels in the first image 800 correspond to pixels in the second image 810. This alignment may address issues such as motion of objects within the scene between the two exposures, motion of the camera 1427 between the two exposures, and changes in the magnification or distortion or both between the two exposures. The alignment may be global across the entire images 800 and 810, local within subregions of the images 800 and 810, or both. Many such alignment processes are known to those skilled in the art.

Also shown in FIG. 8 are two image patches, which are subsets of the pixels in each image. The first image patch 840 is from the first image 800 and is referred to as $f_1$. The second image patch 850 is from the second image 810 and is referred to as $f_2$. The first patch $f_1$ 840 is defined with reference to the first selected pixel 820 in the first image 800 such that the first selected pixel 820 occurs at coordinates $(x_1, y_1)$ with respect to a pixel 842 at the upper left corner of the first patch $f_1$ 840. The second patch $f_2$ 850 is defined with reference to the selected pixel 830 in the second image 810 such that the selected pixel 830 occurs at coordinates $(x_2, y_2)$ with respect to a pixel 852 at the upper left corner of the second patch $f_2$ 850, where $(x_2, y_2)=(x_1, y_1)$. In alternative implementations it may be the case that $(x_2, y_2) \neq (x_1, y_1)$. The patches should be the same size to ensure appropriate comparison of image content contained therein.

Returning to FIGS. 15A to 15C, the patches may be formed by simple division of the images or parts of the images into blocks. In the example of the image pair 1501 and 1502 shown in FIGS. 15A and 15B respectively, the image content is sufficiently aligned that the patches may be formed by dividing the images into a 4×4 configuration of blocks. In the example of the image pair 1501 and 1503 shown in FIGS. 15A and 15C respectively, the regions 1511 and 1513 showing common scene content may be divided into patches in a similar blockwise manner (not illustrated). Alternatively, the patches may be formed in a manner such that the patches vary in size across the images.

Figure 9:
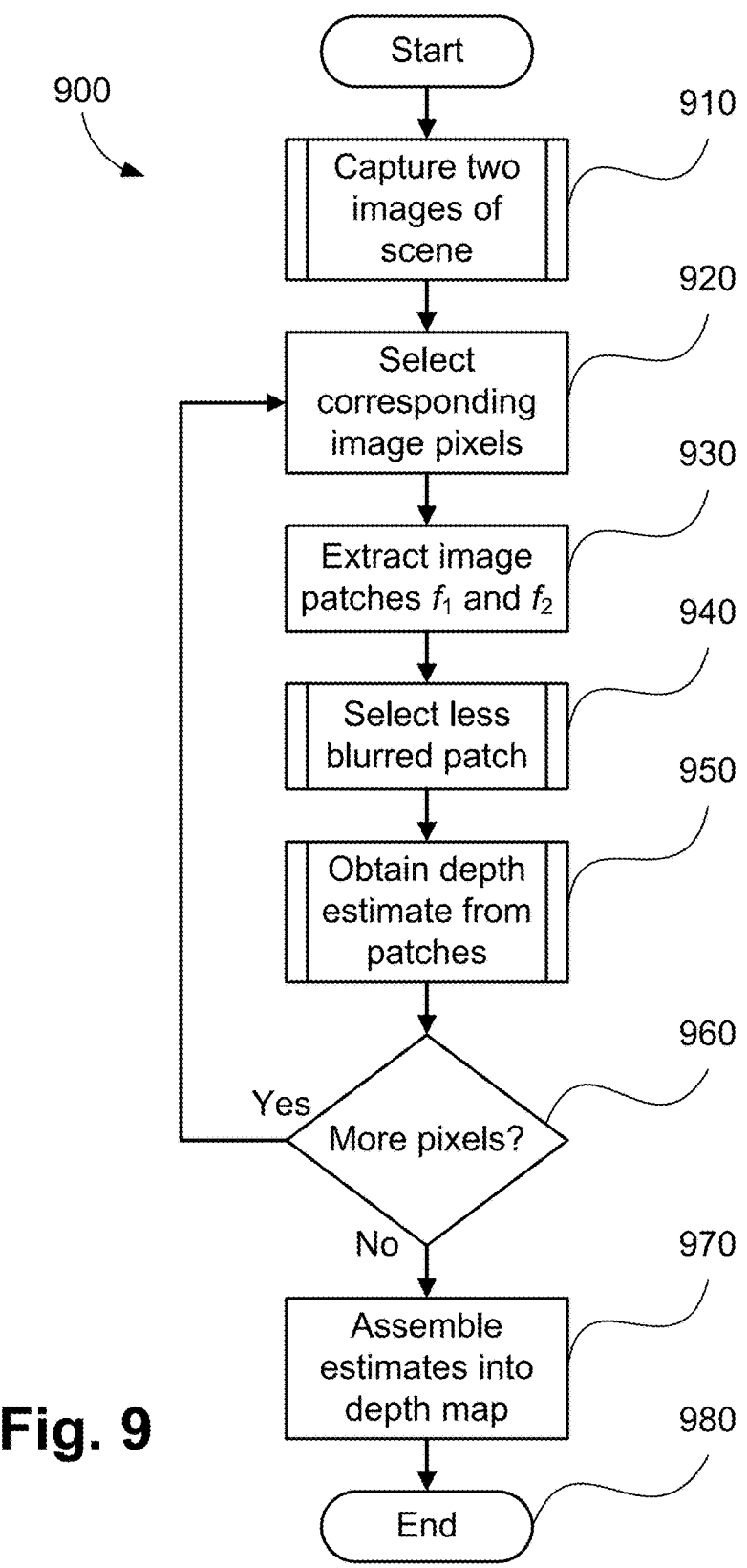
FIG. 9 is a schematic flow diagram illustrating an exemplary method of determining a depth map from two images of a scene, according to the present disclosure.

FIG. 9 illustrates a depth mapping process 900 in which a depth map is determined using a DFD method. In an image capture step 910, two images 800 and 810 of a scene are captured by an image capture device 100, such as the camera 1427. The images 800 and 810 should include image content of a common part of the scene content. For example, with reference to FIG. 1 the common part could be the object 140. In FIGS. 15A and 15C the common part is the person next to the tree, whereas in FIGS. 15A and 15B, the common part is the entirety of the images. The images are captured with at least one of the camera parameters of focus, aperture, zoom, or some other parameter that influences the amount of blur in the image, being different between the images. Ideally the images are captured such that any motion of the objects in the scene and any relative motion of the camera 1427 with respect to the scene is minimised. For example, with reference to FIGS. 15A and 15C, which are representative of such relative motion, an alignment process may be performed on the two images to provide that the common parts as found in each image are appropriately aligned prior to DFD processing. This may involve, for example, aligning the image data within the rectangles 1511 and 1513 with each other, or cropping the images to those rectangles.

Figure 10:
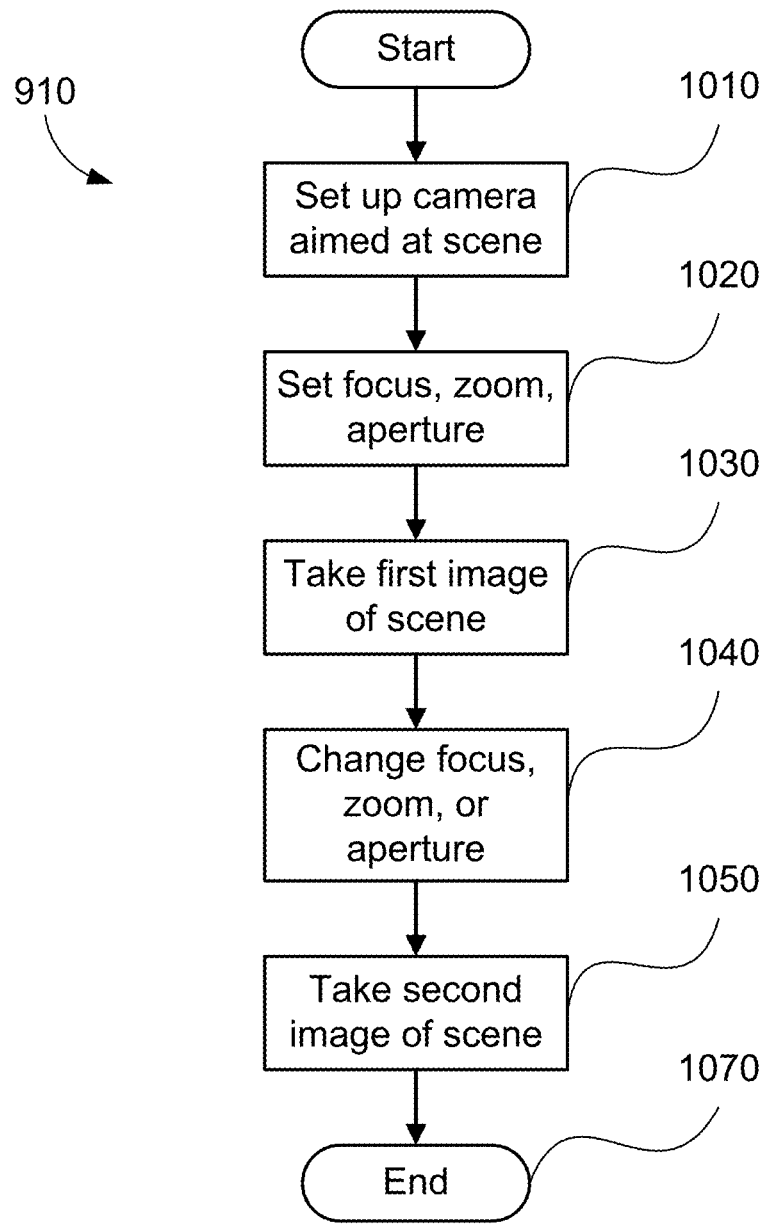
FIG. 10 is a schematic flow diagram illustrating one example of a method of capturing two images as used in the method of FIG. 9.

A specific implementation of the image capture step 910 is described in more detail below with reference to FIG. 10. Typically the images 800 and 810 are captured by the camera 1427 and communicated to and received by the computer 1401 for storage in one or both of the HDD 1410 and memory 1406. Where the process 900 is performed within the camera 1427, the images 800 and 810 are stored in a memory of the camera 1427 for subsequent processing by an embedded processor thereof.

Steps 920-980 of the process 900 in the present implementation are preferably embodied in and implemented by software, for example stored on the HDD 1410 and executable by the processor 1405 in concert with the memory 1406. In a pixel selection step 920 which follows the capture step 910, the corresponding pixels 820 and 830 of the two images 800 and 810 are selected and received by the processor 1405 from the memory 1406. A patch extraction step 930 then follows in which an image patch $f_1$ 840 is extracted from the first image 800 and a corresponding image patch $f_2$ 850 is extracted from the second image 810 by operation of the processor 1405. The first image patch $f_1$ 840 is defined at least by the location of the first selected pixel 820 in the first image 800. The second image patch $f_2$ 850 is defined at least by the location of the second selected pixel 830 in the second image 810. The first and second selected pixels should lie in a portion of the images representing a common part of the scene captured by both images, and largely correspond to an identical point in the scene content.

In an asymmetric patch selection step 940 which then follows, a determination is made regarding which of the patches $f_1$ or $f_2$ is the less blurred patch of the two. Details of a specific implementation of the asymmetric patch selection step 940 will be described below with reference to FIG. 11.

A depth estimation step 950 is then performed in which a depth estimate is determined by the processor 1405 processing the pixel data in the first patch $f_1$ 840 and the second patch $f_2$ 850. The depth estimations are typically stored in the memory 1406. The details of two different implementations of the depth estimation step 950 will be described below with reference to FIG. 12 and FIG. 13 respectively.

A pixel decision step 960 then follows where a decision is made by the processor 1405 on whether there remain any pixels in the first image 800 and the second image 810 that have not yet been selected in the pixel selection step 920. If there remain pixels that have not yet been selected, the depth mapping process 900 returns to the pixel selection step 920. In practice, the pixels may be selected in a systematic order such as by iterating along the rows and down the columns of the first image $f_1$ 800. Accordingly, the steps 920-960 proceed for a current patch of all the patches desired to be processed for depth mapping purposes. Each current patch represents a current part of the common part of the scene captured by the images. In some instances, for example the image pair of FIGS. 15A and 15B, because all is common, image patches may span the entirety of the images. In an alternative approach, only a subset of the pixels of the first image $f_1$ 800 may be chosen to be selected, for example by the processor 1405 subsampling the image by selecting only pixels occurring in rows and columns whose pixel coordinate indices are divisible by some integer. In another alternative, a subset of pixels of the first image $f_1$ 800 may be chosen to be selected to avoid any of the resulting patches from covering areas outside the images, thus avoiding any edge effects. In yet another alternative, a subset of pixels of the first image $f_1$ 800 may be chosen to be selected by some other means. Once all required pixels have been selected ('NO' in step 960), the depth mapping process 900 continues to an assembly step 970.

In the assembly step 970, the depth estimates calculated in the depth estimation step 950 are assembled by the processor 1405 to produce a depth map of the scene captured by the image capture device 100. The depth estimates are desirably assembled into an image such that there is a geometric correspondence between the pixel locations of each pixel selected in the pixel selection step 920 and the depth estimate calculated from that pixel in the depth estimation step 950. For example, if the first image 800 is 100×100 pixels and all of the pixels are selected by iterating across rows and down columns, then the consecutive depth estimates can be assembled by placing them into an image 100×100 pixels in size by inserting the depth estimates into successive pixels iterating across rows and down columns. Such reveals a depth map image that may be stored by the processor 1405 in the memory 1406 or HDD 1410. In an alternative implementation the assembly step 970 may be skipped and the depth estimates stored in the memory 1406 may be passed directly as a stream outputs of the process 900 for use as inputs to other processes that may be executable within the computer 1401.

The depth mapping process 900 then ends at end step 980.

7.1 Image Capture

One example of the image capture step 910 will now be described with reference to FIG. 10. In a camera set up step 1010, the image capture device (camera 1427) is aimed at the desired scene. This can be done for example by aiming a hand-held camera, or by setting up a camera on a tripod.

In a camera setting step 1020, various settings associated with the image capture device are set. This refers to settings that have some effect on the amount of blur recorded in the image and includes setting the lens focus position, the zoom position of the lens if it is capable of zooming, and the aperture of the lens. Other image capture device settings which change the amount of blur in the image are possible. These settings may be performed manually by the operator, or automatically by control software executing within the camera based on the scene to be captured.

A first image taking step 1030 then follows, where a (first) image of the scene is captured using the settings set in the camera setting step 1020.

A camera setting change step 1040 follows where the settings of the image capture device are changed from the values set in the camera setting step 1020. This may involve changing one or more of: the lens focus position, the lens zoom position, the lens aperture setting, and any other setting which affects the amount of blur recorded in the image. This change may be performed manually or by the camera control software.

In a second image taking step 1050, a (second) image of the scene is captured using the settings set in the camera setting change step 1040. The image capture process 910 then ends at end step 1070.

In one implementation, the first image taking step 1030, the camera setting change step 1040, and the second image taking step 1050 are performed automatically by the image capture device 100 in response to a single activation of an image capture function of the device 100, for example pressing the shutter button on a camera.

7.2 Asymmetric Patch Selection

Figure 11:
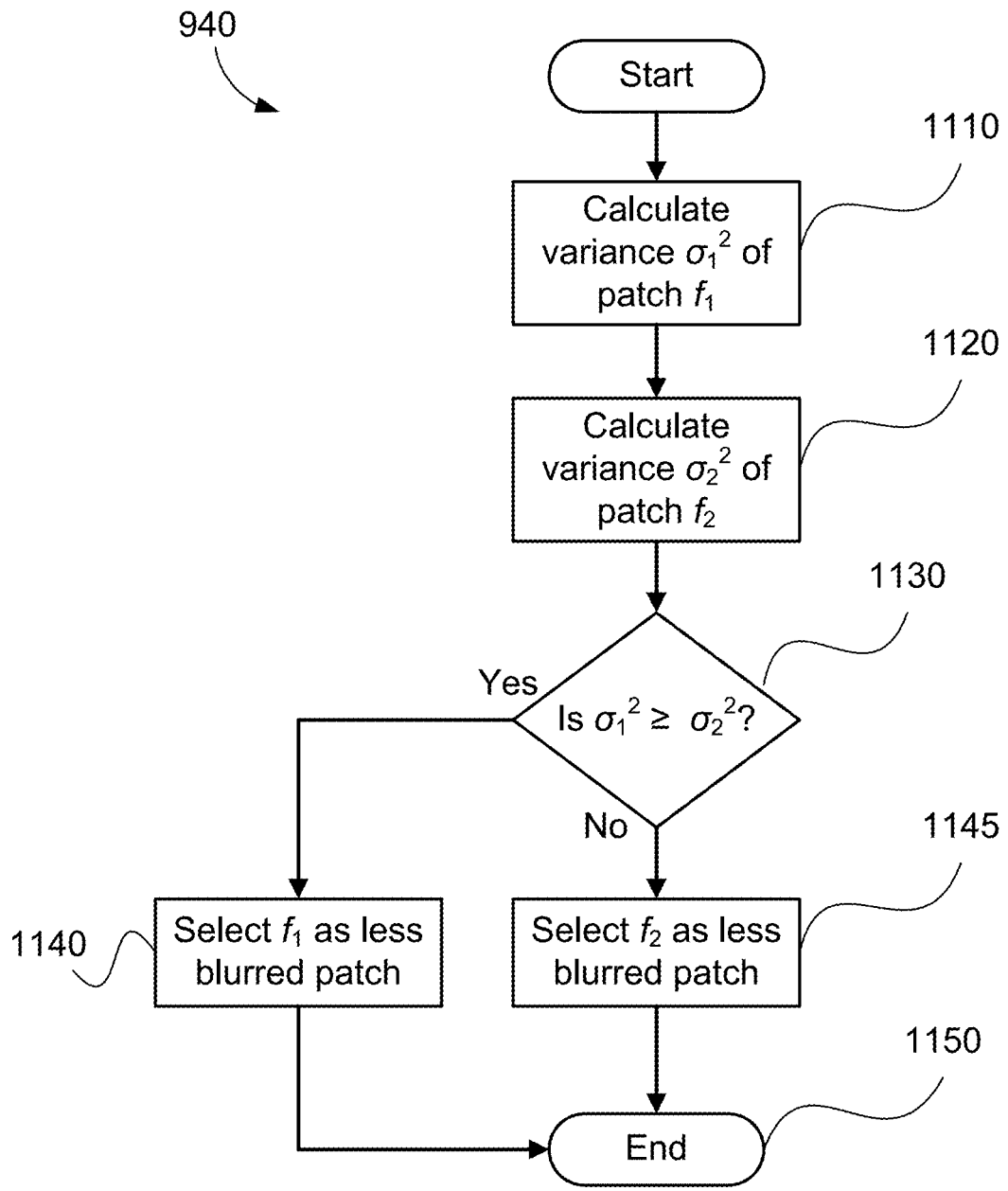
FIG. 11 is a schematic flow diagram illustrating one example of a method of asymmetrical patch selection as used in the method of FIG. 9.

One implementation of the asymmetric patch selection step 940 will now be described with reference to FIG. 11. The asymmetric patch selection process 940 begins with the first image patch $f_1$ 840 and the second image patch $f_2$ 850 as data inputs.

In a first variance calculation step 1110, the variance $\sigma_1^2$ of the pixel values in the patch $f_1$ 840 is calculated, using the well-known definition of variance. In a second variance calculation step 1120, the variance $\sigma_2^2$ of the pixel values in the patch $f_2$ 850 is calculated.

In a variance comparison step 1130, the variance $\sigma_1^2$ of the pixel values in patch $f_1$ 840 is compared to the variance $\sigma_2^2$ of the pixel values in patch $f_2$ 850. If the variance $\sigma_1^2$ of the pixel values in patch $f_1$ 840 is greater than or equal to the variance $\sigma_2^2$ of the pixel values in patch $f_2$ 850, processing continues with a first patch selection step 1140. On the other hand, if the variance $\sigma_1^2$ of the pixel values in patch $f_1$ 840 is less than the variance $\sigma_2^2$ of the pixel values in patch $f_2$ 850, processing continues to a second patch selection step 1145.

In the first patch selection step 1140, patch $f_1$ is selected as the less blurred patch. In the second patch selection step 1145, patch $f_2$ is selected as the less blurred patch. The asymmetric patch selection process 940 then ends at end step 1150.

Other approaches to performing the asymmetric patch selection step 940 are possible. For example, the patches may first be smoothed using a filter to reduce the effects of outlying pixel values caused by imaging noise. The variances of the filtered patches may then be calculated, and the patch with the highest variance after filtering may then be selected as the less blurred patch. In another example, a two-dimensional gradient operator, such as the Laplacian operator, may be applied to the patches, and then the patch with the greatest range of pixel values (i.e. maximum pixel value minus minimum pixel value) in the Laplacian gradient image may be selected as the less blurred patch. In another example, it may be known that the two images 800 and 810 were captured with the aperture value being the only parameter changed between the captures, in which case the patch from the image captured with the narrower aperture may simply be selected as the less blurred patch.

7.3 Depth Estimation Using Mean Spectral Ratio

One implementation 950*a* of the depth estimation step 950 will now be described with reference to FIG. 12. The depth estimation process 950*a* begins with the image patch $f_1$ 840 and the image patch $f_2$ 850 as data inputs. In a first zero mean step 1210, the mean value of the pixel values in the first patch $f_1$ is calculated, and this mean value is then subtracted from the pixel values of all of the pixels in the first patch $f_1$. The result of this calculation is a first zero mean patch, designated $f_1'$.

In a second zero mean step 1220, the mean value of the pixel values in the second patch $f_2$ is calculated, and this mean value is then subtracted from the pixel values of all of the pixels in the second patch $f_2$. The result of this calculation is a second zero mean patch, designated $f_2'$.

In a windowing step 1230, the patches $f_1'$ and $f_2'$ are windowed using a window function that falls to zero or some small value near the edges of the patches. Example window functions include Hann windows, Hamming windows, and similar functions known to those skilled in the art.

A Fourier transform step 1240 follows in which the windowed patches $f_1'$ and $f_2'$ are Fourier transformed, for example using a Fast Fourier Transform (FFT) algorithm, to form Fourier transformed image patches $F_1$ and $F_2$ respectively. The Fourier transformed image patches $F_1$ and $F_2$ will contain complex number values at each pixel.

A blur determination step 1250 follows where reference is made to which of the patches $f_1$ or $f_2$ was selected as the less blurred patch in asymmetric patch selection step 940. If the image patch $f_1$ 840 was selected as the less blurred patch, the depth estimation process 950*a* continues to a first spectral ratio step 1260*a*. On the other hand, if the image patch $f_2$ 850 was selected as the less blurred patch, the depth estimation process 950*a* continues to a second spectral ratio step 1260*b*.

In the first spectral ratio step 1260*a*, the Fourier transformed patches $F_1$ and $F_2$ are divided pixel-wise to form the spectral ratio image patch $F_2/F_1$, using complex number division. In the second spectral ratio step 1260*b*, the Fourier transformed patches $F_1$ and $F_2$ are divided pixel-wise to form the spectral ratio image patch $F_1/F_2$, using complex number division. In both of the spectral ratio steps 1260*a* and 1260*b*, the DC pixel in the spectral ratio is a special case and is set to unity. In both of the spectral ratio steps 1260*a* and 1260*b*, the Fourier transformed patch in the denominator of the formed ratio is the Fourier transformed patch of the image patch determined to be the least blurred. As such, a combination of data from the first and second patches is used to calculate at least one Fourier transform value which in turn is based on the determination in the asymmetric patch selection step 940 of which of the patches is the more focussed image patch.

In a variant of the first spectral ratio step 1260*a*, the moduli of the Fourier transformed patches $F_1$ and $F_2$ are divided pixel-wise to form the modulus component $|F_2|/|F_1|$ of an arc tan spectral ratio, and the phases of the Fourier transformed patches $F_1$ and $F_2$ are subtracted pixel-wise to form the phase component $\arg(F_2)-\arg(F_1)$ of an arc tan spectral ratio, then the modulus component and phase component are combined to form a complex-valued arc tan spectral ratio image patch $|F_2|/|F_1|\exp(i(\arg(F_2)-\arg(F_1)))$. In a variant of the first spectral ratio step 1260*b*, the moduli of the Fourier transformed patches $F_1$ and $F_2$ are divided pixel-wise to form the modulus component $|F_1|/|F_2|$ of an arc tan spectral ratio, and the phases of the Fourier transformed patches $F_1$ and $F_2$ are subtracted pixel-wise to form the phase component $\arg(F_1)-\arg(F_2)$ of an arc tan spectral ratio, then the modulus component and phase component are combined to form a complex-valued arc tan spectral ratio image patch $|F_1|/|F_2|\exp(i(\arg(F_1)-\arg(F_2)))$. In both of the variant spectral ratio steps 1260*a* and 1260*b*, the DC pixel in the spectral ratio is a special case and is set to unity.

A mean calculation step 1270 is then performed where the mean value of all of the pixels in the spectral ratio image patch is calculated from the results obtained from steps 1250, 1260*a* and 1260*b* arising from the combination of data in each of the first and second image patches. By Hermitian symmetry, the mean value of the imaginary components of all the pixels in a symmetrical square region centred on the DC pixel is zero, so the mean value is a real number. In practice there are considerations of double counting certain individual pixels representing the DC and Nyquist frequency components to ensure an unbiased estimate of the mean spectral ratio, such considerations being known to those skilled in the art of discrete Fourier transforms. These considerations may be applied to ensure an unbiased estimate of the mean spectral ratio, or they may be partially or wholly ignored in favour of simply calculating the mean of all of the pixels in the spectral ratio image patch. Partially or wholly ignoring these considerations may result in faster computation times, at the cost of a minor increase in random error in the mean spectral ratio estimate.

In a variant of mean calculation step 1270, the median value of the real components of the pixels in the spectral ratio image patch is calculated, rather than the mean value. This produces the median spectral ratio value, which may be treated thereafter as an alternative estimate of the mean spectral ratio value.

In another variant of mean calculation step 1270, the spectral ratio is calculated over a subset of the pixels in the patch. The subset may be determined by one or more of the following considerations: (1) removing pixels outside the Nyquist frequency of the image sensor; (2) removing pixels outside the diffraction limit frequency of the image capture optics; (3) including only a predetermined fraction of the pixels that have the highest signal-to-noise ratios, as estimated from the modulus of the Fourier transform of one of the input image patches.

In a depth determination step 1280, the mean spectral ratio calculated in mean calculation step 1270, combined with the determination of which patch is less blurred as determined in asymmetric patch selection step 940, is used to determine a depth estimate for the image patches $f_1$ and $f_2$. This can be done using the set of camera parameters used to capture the images and either using a theoretical model relating the mean spectral ratio to the depth of the object in the scene shown in the image patches for the camera parameters, or by reference to a calibration look-up table which lists depth versus mean spectral ratio for the camera parameters. The calibration look-up table may be assembled using either theoretical or experimental results. For example, a theoretical calibration can be compiled by simulating the OTF for a range of object distances and camera parameters, calculating the resulting mean spectral ratios for a range of object distances and camera parameters, and storing the simulated mean spectral ratios in a look-up table. Then the closest match between the look-up table values and the mean spectral ratio calculated from two image patches can be used as an estimate of the depth to the object shown in the image patches.

In another example of step 1280, an experimental calibration can be compiled by placing an object at a range of different distances from a camera, taking two photos of the object at each position with different camera parameters, calculating the mean spectral ratio of image patches showing the object, and storing the mean spectral ratios in a look-up table referenced by distance to the object.

The depth estimation process 950a then ends at end step 1290.

7.4 Depth Estimation Using Modified Normalised Cross Correlation

Another implementation 950b of the depth estimation step 950 will now be described with reference to FIG. 13. The depth estimation process 950b begins with the image patch $f_1$ 840 and the image patch $f_2$ 850 as data inputs.

In a first zero mean step 1310, the mean value of the pixel values in the first patch $f_1$ is calculated, and this mean value is then subtracted from the pixel values of all of the pixels in the first patch $f_1$. The result of this calculation is a first zero mean patch, designated $f_1'$.

In a second zero mean step 1320, the mean value of the pixel values in the second patch $f_2$ is calculated, and this mean value is then subtracted from the pixel values of all of the pixels in the second patch $f_2$. The result of this calculation is a second zero mean patch, designated $f_2'$.

A product step 1330 follows where the first zero mean patch $f_1'$ and the second zero mean patch $f_2'$ are multiplied pixel-wise to produce the product patch $f_1'f_2'$.

A numerator step 1340 is then performed where the pixel values of all the pixels in the product patch $f_1'f_2'$ are summed to produce the numerator value N. In an alternative implementation of step 1340, a subset of the pixels defined by a window function in the product patch $f_1'f_2'$ are summed to produce the numerator value N.

A blur determination step 1350 follows where reference is made to which of the patches $f_1$ or $f_2$ was selected as the less blurred patch in asymmetric patch selection step 940. If the image patch $f_1$ 840 was selected as the less blurred patch, the depth estimation process 950b continues to the first denominator step 1360. On the other hand, if the image patch $f_2$ 850 was selected as the less blurred patch, the depth estimation process 950b continues to the second denominator step 1365.

In the first denominator step 1360, the first zero mean patch $f_1'$ is multiplied pixel-wise by itself to produce the first normalisation patch $f_1'f_1'$, then the pixel values of all the pixels in the first normalisation patch $f_1' f_1'$ are summed to produce the denominator value D. In an alternative implementation, a subset of the pixels defined by a window function in the first normalisation patch $f_1'f_1'$ are summed to produce the denominator value D.

In the second denominator step 1365, the second zero mean patch $f_2'$ is multiplied pixel-wise by itself to produce the second normalisation patch $f_2'f_2'$, then the pixel values of all the pixels in the second normalisation patch $f_2' f_2'$ are summed to produce the denominator value D. In an alternative implementation, a subset of the pixels defined by a window function in the second normalisation patch $f_2' f_2'$ are summed to produce the denominator value D.

A normalisation step 1370 follows each of steps 1360 and 1365, where the numerator value N is divided by the denominator value D to produce the modified normalised cross-correlation central value N/D. Step 1370 operates upon a combination data obtained from each of the first and second patches.

Lastly in a depth determination step 1380, the modified normalised cross-correlation central value N/D calculated in normalisation step 1370, combined with the determination of which patch is less blurred as determined in asymmetric patch selection step 940, is used to determine a depth estimate for the image patches $f_1$ and $f_2$. This can be done either using a theoretical model relating the modified normalised cross-correlation value N/D to the depth of the object in the scene shown in the image patches for the set of camera parameters used to capture the images, or by reference to a calibration look-up table which lists depth versus modified normalised cross-correlation value N/D for the set of camera parameters used to capture the images.

The depth estimation process 950b then ends at end step 1390.

Figure 13:
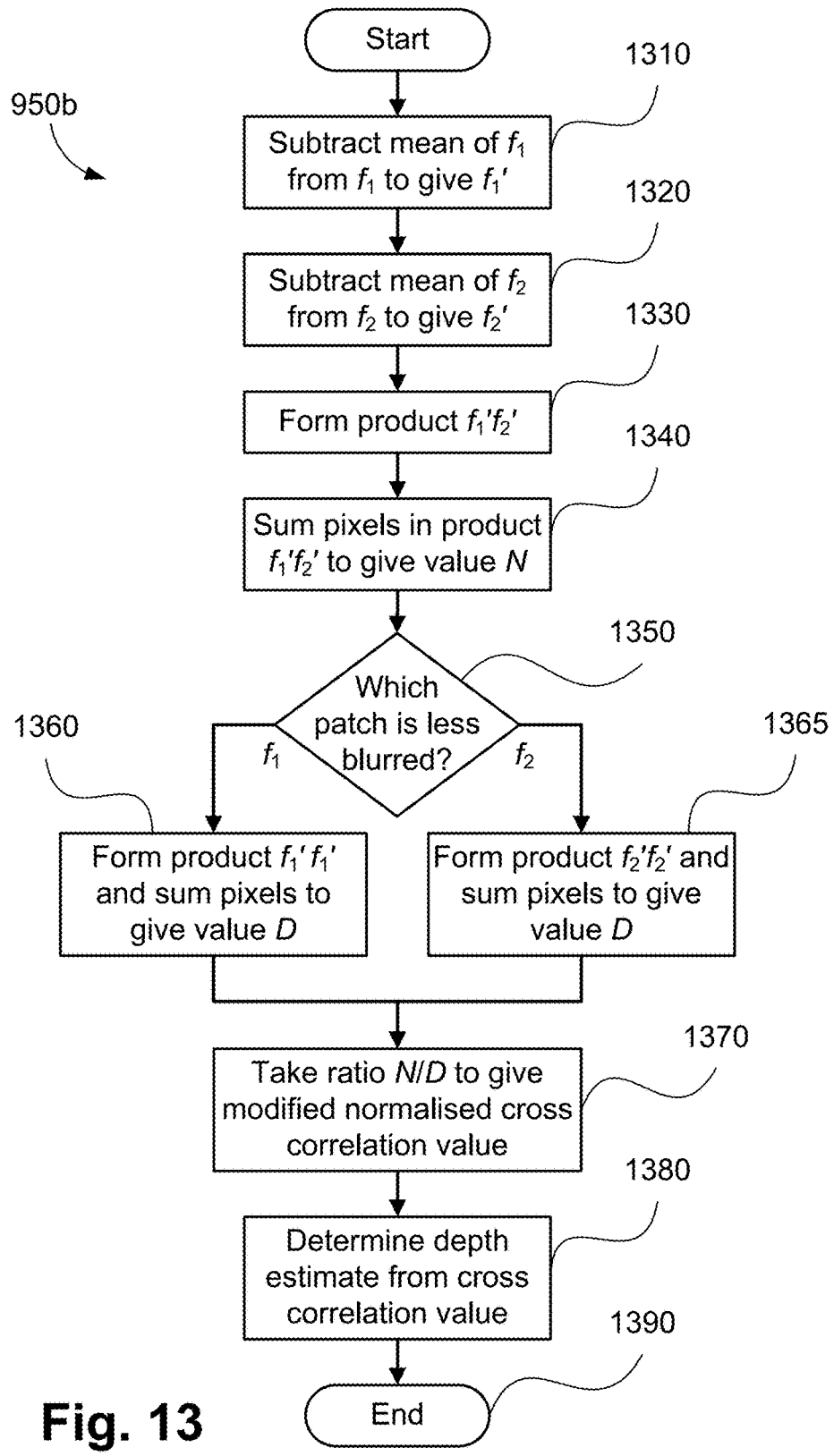
FIG. 13 is a schematic flow diagram illustrating another example of a method of determining a depth estimate from two corresponding patches of two images of a scene as used in the method of FIG. 9.

An further alternative implementation (not illustrated) of the depth estimation step 950 proceeds largely as described in the depth estimation process 950b illustrated in FIG. 13, but includes an additional step in which the Laplacian gradient images of patch $f_1$ and patch $f_2$ are calculated prior to the first zero mean step 1310. The Laplacian of patch $f_1$ is called $g_1$, and the Laplacian of patch $f_2$ is called $g_2$. Depth estimation process 950b illustrated in FIG. 13 is given the patches $g_1$ and $g_2$ as input rather than $f_1$ and $f_2$ and then proceeds as described above (substituting $g_1$ for $f_1$ and $g_2$ for $f_2$).

7.5 Variations

Figure 12:
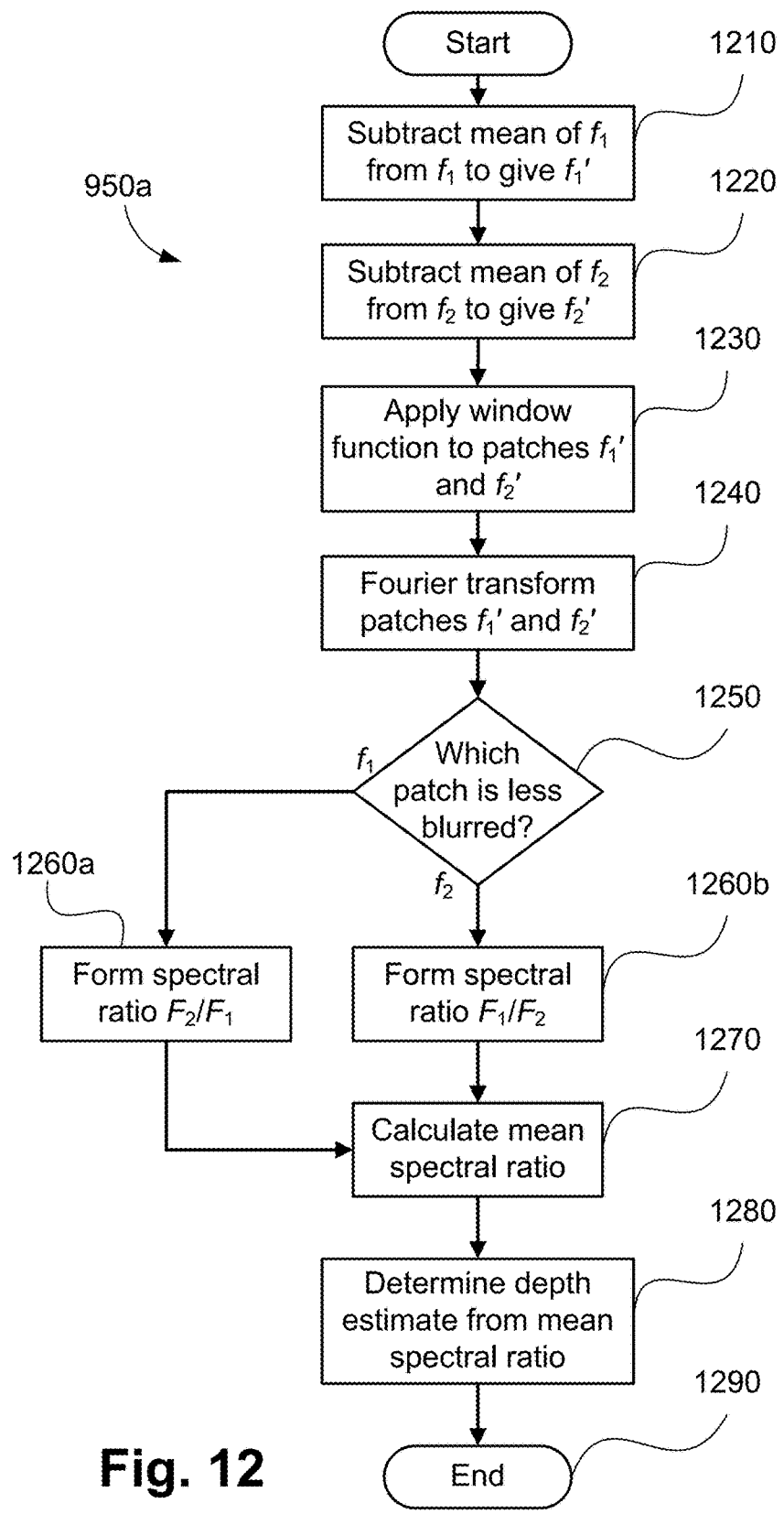
FIG. 12 is a schematic flow diagram illustrating one example of a method of determining a depth estimate from two corresponding patches of two images of a scene as used in the method of FIG. 9.

Many variations of the processes of FIGS. 12 and 13 may be performed. For example, the processes may be applied to different colour channels of the input image patches, thereby calculating multiple values for each image patch.

In another variation, multiple values may be calculated from each pair of input image patches by using different windowing functions.

In a further variation, each of the processes of FIGS. 12 and 13 may be performed, simultaneously for example, to give two values.

In each of these variations, corresponding depth estimates may be obtained from the multiple values and then averaged or combined in some other manner, or selected from using some selection criterion, to give a depth estimate for the patches under consideration.

8. Summary

The process 900 and the various alternatives by which the process 900 may be implemented results in a depth map image or a stream of depth map values that offer utility in manners known widely in the art but which has been obtained via the process 900 in a significantly more efficient manner compared to prior processes.

INDUSTRIAL APPLICABILITY

The arrangements described are applicable to the computer and data processing industries and particularly for the formation of depth map data from images captured using cameras and like capture devices.

The foregoing describes only some embodiments of the present invention, and modifications and/or changes can be made thereto without departing from the scope and spirit of the invention, the embodiments being illustrative and not restrictive.

The invention claimed is:

1. A method for determining a depth measurement associated with a scene captured by an image capture device, the method comprising:
receiving a first image and a second image of the scene captured by the image capture device, the first image being captured using at least one different camera parameter than that of the second image;
selecting a first patch from the first image;
selecting a second patch from the second image to correspond with the first patch such that the first and second patches represent a common part of the scene;
determining which of the first and second patches is more focused;
calculating Fourier transforms for each of the first and second patches; and
calculating a ratio of the Fourier transforms corresponding to the first and second patches to produce an estimate of a complex OTF ratio, with the Fourier transform of the more focused patch as denominator of the ratio, the estimate of the complex OTF ratio representing relative blur of the first and second patches and being a function of distance to the objects in the common part of the scene; and
determining the depth measurement of the common part of the scene from the estimate of the complex OTF ratio.

2. The method according to claim 1, wherein the estimate of the complex OTF ratio is a mean of the OTF ratio over an area.

3. The method according to claim 1, wherein the estimate of the complex OTF ratio is a median of the OTF ratio over an area.

4. The method according to claim 1, wherein the estimate of the complex OTF ratio is a weighted mean of the OTF ratio over an area defined by a weighting function.

5. The method according to claim 4, wherein the weighting function is zero at spatial frequencies greater than a Nyquist limit of the image capture device.

6. The method according to claim 4, wherein the weighting function is zero at spatial frequencies determined by selecting a predetermined fraction of pixels with a lower modulus of the Fourier transform of one of the first and second patches.

7. The method according to claim 1, wherein the ratio of the complex OTFs is determined by:
calculating an arc tangent of ratios of moduli of the Fourier transforms, multiplied by a complex phase equal to a difference of phases of the Fourier transforms, to produce an estimate of the ratio of the complex OTFs, with the complex OTF of the more focused patch as a denominator of the ratio.

8. The method according to claim 1, wherein determining which of the first and second patches is the more focused patch is done by calculating a variance of each of the first and second patches and selecting the more focused patch as one with a higher variance.

9. The method according to claim 1, wherein the selecting of the first and second patches comprises aligning the first image to the second image based on content of the images.

10. A method for determining a depth map associated with a scene captured by an image capture device, the method comprising:
receiving a first image and a second image of the scene captured by the image capture device, the first image being captured using at least one different camera parameter than that of the second image;
determining a depth measurement for a plurality of parts of the scene by:
(a) (i) selecting at least a first patch from the first image;
(ii) selecting a second patch from the second image to correspond with the first patch for a current part of the scene such that the first and second patches in the current part represent a common part of the scene;
(b) determining which of the first and second patches is a more focused patch;
(c0) calculating Fourier transforms for each of the first and second patches;
(c) calculating a ratio of the Fourier transforms corresponding to the first and second patches to produce an estimate of a complex OTF ratio, with the Fourier transform of the more focused patch as denominator of the ratio, the estimate of the complex OTF ratio representing relative blur of the first and second patches and being a function of distance to the objects in the common part of the scene;
(d) determining the depth measurement of the current part of the scene from the estimate of the complex OTF ratio; and
(e) repeating steps (a) to (d) using corresponding patches in at least one other part of the common part of the scene represented by the first and second images; and
assembling the determined depth measurements into a depth map of the common part of the scene.

11. A computer readable non-transitory storage medium having a program recorded thereon, the program being executable by a computerized apparatus to determine a depth measurement associated with a scene captured by an image capture device, the program comprising:
code for receiving a first image and a second image of the scene captured by the image capture device, the first image being captured using at least one different camera parameter than that of the second image;
code for selecting a first patch from the first image;
code for selecting a second patch corresponding to the first patch from the second image such that the first and second patches represent a common part of the scene;
code for determining which of the first and second patches is a more focused patch;

code for calculating Fourier transforms for each of the first and second patches;

code for calculating a ratio of the Fourier transforms corresponding to the first and second patches to produce an estimate of a complex OTF ratio, with the Fourier transform of the more focused patch as denominator of the ratio, the estimate of the complex OTF ratio representing relative blur of the first and second patches and being a function of distance to the objects in the common part of the scene; and code for determining the depth measurement of the common part of the scene from the estimate of the complex OTF ratio.

12. An apparatus for determining a depth measurement associated with a scene captured by an image capture device, the apparatus comprising:

means for receiving a first image and a second image of the scene captured by the image capture device, the first image being captured using at least one different capture parameter than that of the second image;

means for selecting a first patch from the first image;

means for selecting a second patch corresponding to the first patch from the second image such that the first and second patches represent a common part of the scene;

means for determining which of the first and second patches is a more focused patch;

means for calculating Fourier transforms for each of the first and second patches;

means for calculating a ratio of the Fourier transforms corresponding to the first and second patches to produce an estimate of a complex OTF ratio, with the Fourier transform of the more focused patch as denominator of the ratio, the estimate of the complex OTF ratio representing relative blur of the first and second patches and being a function of distance to the objects in the common part of the scene;

means for determining the depth measurement of the common part of the scene from the estimate of the complex OTF ratio.

13. An image capture device, comprising:

a capture system for receiving a first image and a second image of the scene captured by the image capture device, the first image being captured using at least one different capture parameter than that of the second image;

a memory into which the first image and the second image are stored;

a processor configured for determining a depth measurement associated with a scene captured by the first image and the second image, the processor being configured to:

select a first patch from the first image;

select a second patch corresponding to the first patch from the second image such that the first and second patches represent a common part of the scene;

determine which of the first and second patches is a more focused patch;

calculate Fourier transforms for each of the first and second patches;

calculate a ratio of the Fourier transforms corresponding to the first and second patches to produce an estimate of a complex OTF ratio, with the Fourier transform of the more focused patch as denominator of the ratio, the estimate of the complex OTF ratio representing relative blur of the first and second patches and being a function of distance to the objects in the common part of the scene; and determine the depth measurement of the common part of the scene from the estimate of the complex OTF ratio.

14. An image capture device comprising:

a capture system for receiving a first image and a second image of the scene captured by the image capture device, the first image being captured using at least one different capture parameter than that of the second image;

a memory into which the first image and the second image are stored;

a processor coupled to the memory and configured to determine a depth map associated with the scene captured with the images, the processor being operable to:

determine a depth measurement for a plurality of parts of the scene captured by the images by:
(a) (i) selecting a first patch from the first image;
(ii) selecting a second patch corresponding to the first patch from the second image for a current part of the scene such that the first and second patches in the current part represent a common part of the scene;
(b) determining which of the first and second patches is a more focused patch;
(c0) calculating Fourier transforms for each of the first and second patches;
(c) calculating a ratio of the Fourier transforms corresponding to the first and second patches to produce an estimate of a complex OTF ratio, with the Fourier transform of the more focused patch as denominator of the ratio, the estimate of the complex OTF ratio representing relative blur of the first and second patches and being a function of distance to the objects in the common part of the scene;
(d) determining the depth measurement of the current part of the scene from the estimate of the complex OTF ratio; and
(e) repeating steps (a) to (d) using corresponding patches in at least one other part of the common part of the scene; and assemble the depth measurements into a depth map of the common part of the scene.

15. A depth measurement formed by the method according to claim 1.

16. A method according to claim 1, wherein the step of calculating the ratio of Fourier transforms comprises:

determining first and second zero mean (ZM) patches from the first and second patches, respectively; and calculating the ratio of the Fourier transforms for the first and second ZM patches to produce an estimate of a complex OTF ratio, with the Fourier transform of the more focused patch as denominator of the ratio.

* * * * *